(12) United States Patent
Holung et al.

(10) Patent No.: US 11,455,008 B2
(45) Date of Patent: Sep. 27, 2022

(54) SYSTEM HINGE ASSEMBLY

(71) Applicant: Lenovo (Singapore) Pte. Ltd., Singapore (SG)

(72) Inventors: Joseph Anthony Holung, Wake Forest, NC (US); Bouziane Yebka, Apex, NC (US); Philip John Jakes, Durham, NC (US); Tin-Lup Wong, Chapel Hill, NC (US); Kenneth Scott Seethaler, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 2 days.

(21) Appl. No.: 16/915,043

(22) Filed: Jun. 29, 2020

(65) Prior Publication Data

US 2021/0405693 A1 Dec. 30, 2021

(51) Int. Cl.
*G06F 1/16* (2006.01)

(52) U.S. Cl.
CPC .......... *G06F 1/1618* (2013.01); *G06F 1/1681* (2013.01)

(58) Field of Classification Search
None
See application file for complete search history.

(56) References Cited

U.S. PATENT DOCUMENTS

| 10,480,225 | B1 * | 11/2019 | Hsu | E05D 3/12 |
| 10,501,973 | B2 * | 12/2019 | Määttä | H04M 1/022 |
| 10,592,051 | B1 * | 3/2020 | Yildiz | G06F 1/1694 |
| 10,732,677 | B2 * | 8/2020 | Gopalan | H04M 1/02 |
| 10,775,852 | B2 * | 9/2020 | Kim | H04M 1/022 |
| 2015/0378399 | A1 * | 12/2015 | Grinstead | G06F 1/1681 |
| | | | | 361/679.09 |
| 2017/0145725 | A1 * | 5/2017 | Siddiqui | E05D 3/12 |
| 2018/0166842 | A1 * | 6/2018 | Siddiqui | F16C 11/04 |
| 2018/0209473 | A1 * | 7/2018 | Park | H04M 1/022 |

OTHER PUBLICATIONS

Hribar, Jure, Magnetic Braking, University of Ljubljana, Apr. 11, 2008 (13 pages).
Futek, Hinge Fatigue Testing, Aug. 1, 2016 (1 page).
Kikuchi et al., In-depth Learning of Cogging/Detenting Torque through Experiments and Simulations, IEEE, Nov. 1998 (https://www.ewh.ieee.org/soc/es/Nov1998/12/BEGIN.HTM) (18 pages).
Lunk et al., Exploring Magnetic Fields with a Compass, The Physics Teacher, vol. 49, pp. 45-48, Jan. 2011 (4 pages).

* cited by examiner

*Primary Examiner* — Anthony Q Edwards
*Assistant Examiner* — Rashen E Morrison
(74) *Attorney, Agent, or Firm* — Brian J. Pangrle

(57) ABSTRACT

A system can include a first housing that includes a processor and memory accessible to the processor; a second housing that includes a display operatively coupled to the processor; a hinge F assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counterclockwise restoring torque responsive to rotation in a second, opposite rotational direction from the aligned orientation.

20 Claims, 26 Drawing Sheets

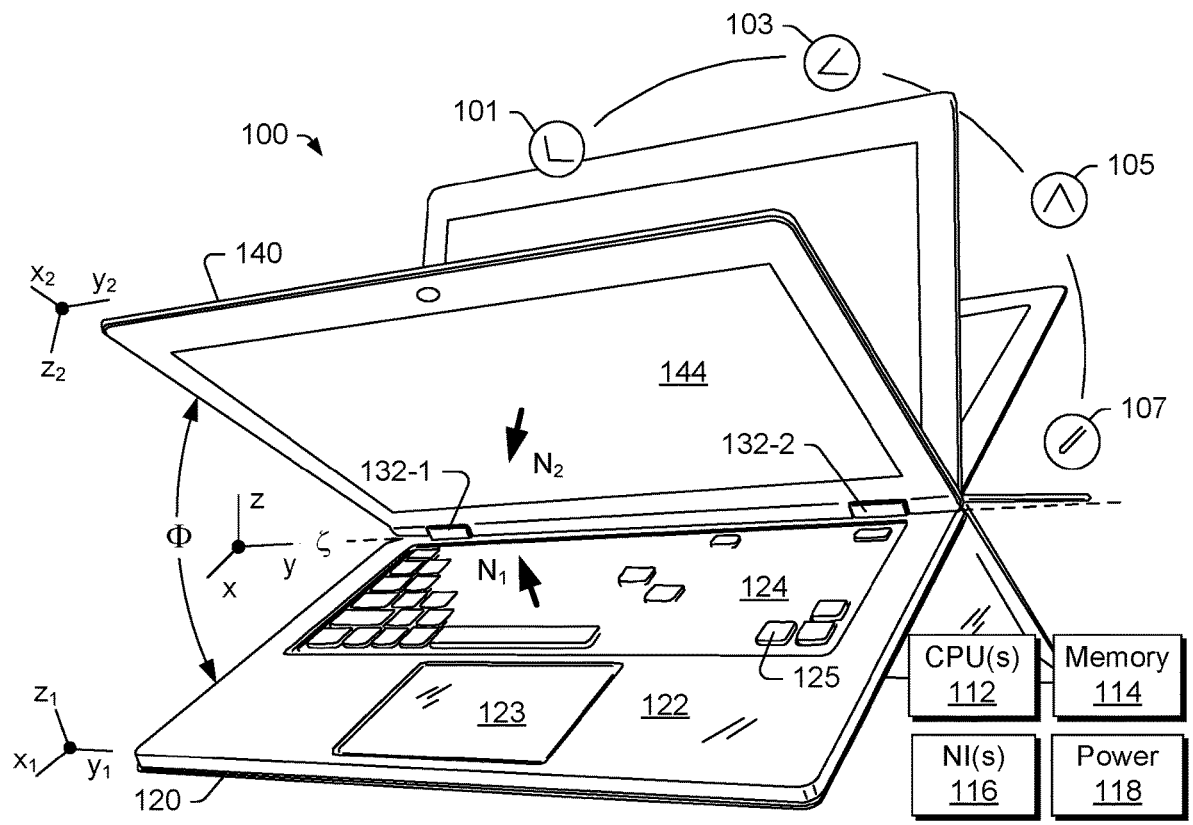
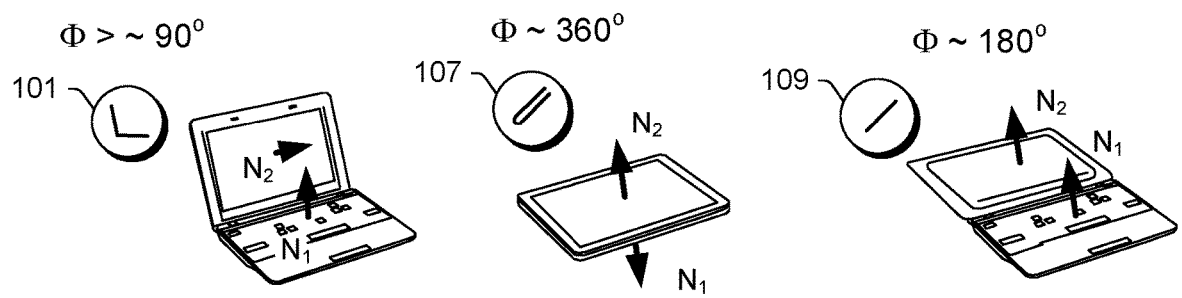
FIG. 1

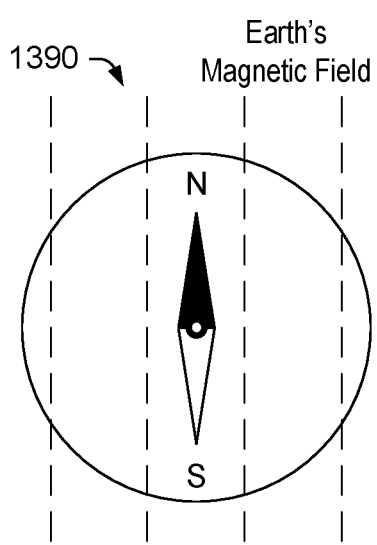 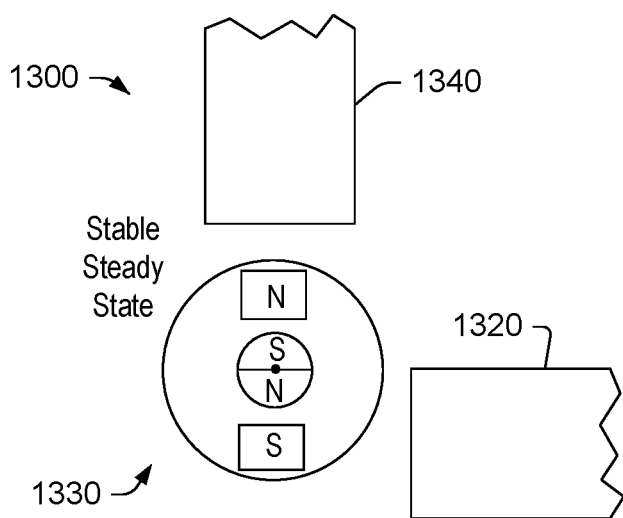
FIG. 13A
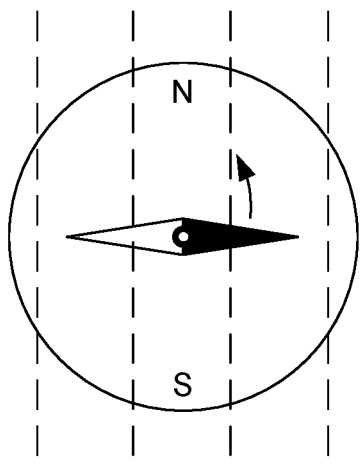 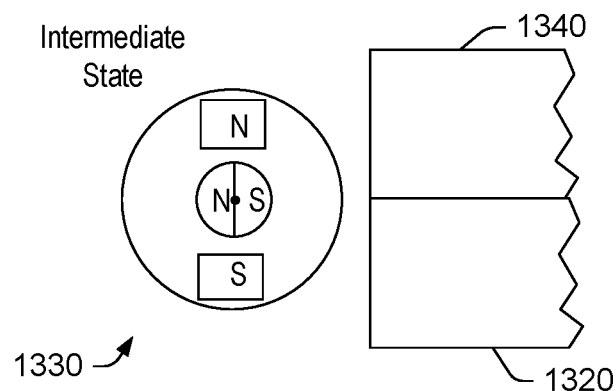
FIG. 13B
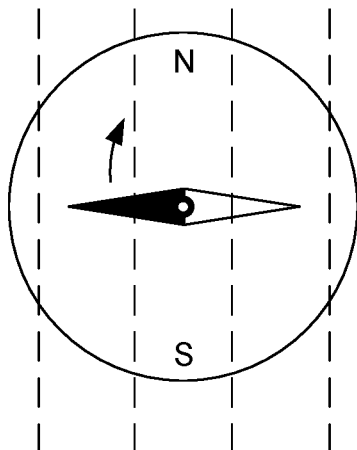 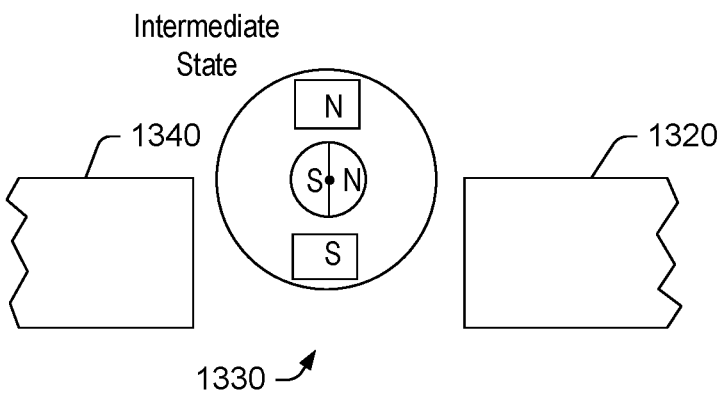
FIG. 13C Table 1900

| Domain1 | Domain2 | Relation | Interface | Equation |
|---|---|---|---|---|
| Iron | Magnet | $H_\theta^3 = -\frac{1}{r}\frac{\partial \psi 3}{\partial \theta} = 0$ | $r=R_4$ | 9 |
| Magnet | Air gap | $H_\theta^3 = H_\theta^2$ $(-\frac{1}{r}\frac{\partial \psi 3}{\partial \theta} = -\frac{1}{r}\frac{\partial \psi 2}{\partial \theta})$ | $r=R_3$ | 10 |
| Magnet | Air gap | $B_r^3 = B_r^2$ | $r=R_3$ | 11 |
| Air gap | Magnet | $H_\theta^2 = H_\theta^1$ $(-\frac{1}{r}\frac{\partial \psi 2}{\partial \theta} = -\frac{1}{r}\frac{\partial \psi 1}{\partial \theta})$ | $r=R_2$ | 12 |
| Air gap | Magnet | $B_r^2 = B_r^1$ | $r=R_2$ | 13 |
| Magnet | Iron | $H_\theta^1 = -\frac{1}{r}\frac{\partial \psi 1}{\partial \theta} = 0$ | $r=R_1$ | 14 |

FIG. 19

Method 2300

Stabilizing a Display Housing with respect to a Keyboard Housing of an Information Handling System (IHS)

SYSTEM HINGE ASSEMBLY

TECHNICAL FIELD

Subject matter disclosed herein generally relates to technology for computing systems or other systems.

BACKGROUND

Various types of devices, systems, display systems, computing and display systems, etc. exist where, for example, a hinge assembly allows for orienting one portion with respect to another portion. For example, a display portion may be oriented with respect to a keyboard portion of a system.

SUMMARY

A system can include a first housing that includes a processor and memory accessible to the processor; a second housing that includes a display operatively coupled to the processor; a hinge assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counterclockwise restoring torque responsive to rotation in a second, opposite rotational direction from the aligned orientation. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 1 is a diagram of an example of a system;
FIG. 13A, FIG. 13B and FIG. 13C are a series of diagrams of an example of a system and examples states;
FIG. 19 is a table with examples of boundary conditions.

DETAILED DESCRIPTION

Figure 2:
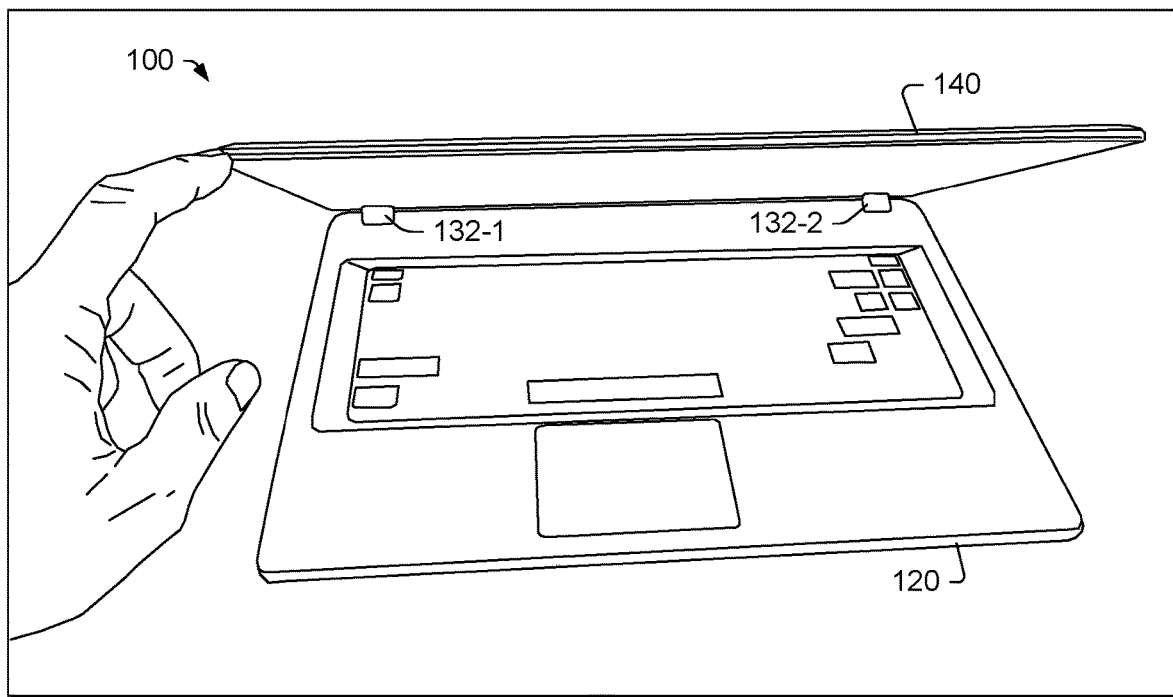
FIG. 2 is a perspective view of the system of FIG. 1.

The following description includes the best mode presently contemplated for practicing the described implementations. This description is not to be taken in a limiting sense, but rather is made merely for the purpose of describing general principles of various implementations. The scope of invention should be ascertained with reference to issued claims.

FIG. 1 shows an example of a system 100 that includes a keyboard housing 120 and a display housing 140 that are rotatable with respect to each other via movement about one or more hinges assemblies 132-1 and 132-2. The system 100 may be a device such as, for example, a computing device (e.g., an information handling device).

As an example, the system 100 may include one or more processors 112, memory 114 (e.g., one or more memory devices), one or more network interfaces 116, and one or more power cells 118 (e.g., one or more lithium-ion rechargeable batteries, etc.). Such components may be, for example, housed within the keyboard housing 120, the display housing 140, or the keyboard housing 120 and the display housing 140.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along a y-axis ($y_1$), a length along an x-axis ($x_1$) and a height along a z-axis ($z_1$) that extends in a direction outwardly away from touch surfaces of keys 125 of the keyboard 124 and the display 144 is defined in a second Cartesian coordinate system as having a width along an y-axis ($y_2$), a length along an x-axis ($x_2$) and a height along a z-axis ($z_2$) that extends in a direction outwardly away from a viewing surface of the display 144. As an example, a coordinate system may be right-handed or left-handed.

As shown in the example of FIG. 1, the one or more hinge assemblies 132-1 and 132-2 rotatably connect the keyboard housing 120 and the display housing 140 for orienting the display housing 140 with respect to the keyboard housing 120. For example, orientations may include orientations definable with respect to an axis (e.g., or axes) such as the axis ζ and an angle Φ about that axis. In the example of FIG. 1, another Cartesian coordinate system is shown, with a y-axis that can be parallel to the axis ζ where the z-axis may be directed upwardly, opposite gravity where an x-axis and the y-axis can define a plane where the z-axis is normal to the x,y-plane. As an example, the system 100 can be positioned on a horizontal surface such as a desk surface (e.g., a desktop), a table surface, a countertop surface, etc., where the horizontal surface is parallel to the x,y-plane and where gravity is normal to the horizontal surface in a downwardly directed direction (e.g., acceleration due to gravity, G, is in a direction toward the ground). In various instances, the system 100 may be positioned on a surface or surfaces that are not horizontal (e.g., legs, a tilted desktop, etc.).

The system 100 can be defined by a mass, which can include a mass of the keyboard housing 120 and a mass of the display housing 140, which may be the same or may differ. For example, the mass of the keyboard housing 120 may exceed the mass of the display housing 140. In such an example, the keyboard housing 120 may help to stabilize the system 100 when positioned on a surface such as a horizontal surface. For example, consider the keyboard housing 120 as having a mass that exceeds a mass of the display housing 140 and where the keyboard housing 120 helps to stabilize the system 100 on a horizontal surface for angles $\Phi$ that exceeds approximately 90 degrees. In such an example, the mass difference may help to keep the system 100 from tipping backwards as the mass of the display housing 140 can generate a moment, which may be defined, for example, as a moment of force acting on an object (e.g., a torque), which may be the product of a force and a distance with respect to a reference point.

A force applied perpendicularly to a lever multiplied by its distance from a fulcrum of the lever (e.g., a length of the lever arm) can define the torque of the lever about the fulcrum. For example, a force of three newtons applied two meters from a fulcrum may exert the same torque as a force of one newton applied six meters from the fulcrum. As to a convention, the direction of torque may be determined by using a right hand grip rule where, if the fingers of the right hand are curled from the direction of the lever arm to the direction of the force, then the thumb points in the direction of the torque. For such a convention, when the angle $\Phi$ is greater than approximately 90 degrees, for a force equal to mg (e.g., F=mg) acting at a lever arm length of L, the torque points in the −y direction; whereas, when the angle $\Phi$ is less than approximately 90 degrees, the torque for the same force points in the +y direction; and, when the angle $\Phi$ is approximately 90 degrees, the torque is approximately zero.

Various clamshell types of systems that include one or more hinge assemblies may include one or more friction elements that impart friction that overcomes gravitational force and associated torque. Such a friction element approach can help to maintain a desired angle $\Phi$, which may be, for example, a viewing angle such as an ergonomic viewing angle for a display by a user of a clamshell system, where the viewing angle can be defined between a keyboard housing and a display housing that includes the display. Such a friction element approach may provide for additional amount of friction such that vibration or some amount of shock does not cause a change in the viewing angle. For example, consider vibration from touch typing or consider a user on a plane, a train, in a car, etc., where a rough road, a curb, etc., may cause some amount of shock that does not overcome friction generated by one or more friction elements.

As to a shock, consider a downward movement of an object coupled to a hinge as a fulcrum that is abruptly halted. In such an example, the object may gain momentum such that the abrupt halt causes the object to overcome friction of the hinge and rotate about the hinge, which can be undesirable to a user.

FIG. 1 shows some examples of orientations 101, 103, 105, 107 and 109. The orientations 101, 103, 105, 107 and 109 may correspond to orientations of a clamshell computing device. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

The orientation 109 may be a planar orientation where the angle $\Phi$ is approximately 180 degrees such that a normal outward vector $N_1$ of the keyboard 124 of the keyboard housing 120 and a normal outward vector $N_2$ of the display 144 of the display housing 140 are oriented in approximately the same pointing directions.

In the example of FIG. 1, one or more of the hinge assemblies 132-1 and 132-2 can include permanent magnets, which can be or include radially magnetized permanent magnets. In such an approach, the magnetic fields of the permanent magnets can generate torque, which may be analyzed in a static sense or a dynamic sense.

As to a static sense, consider torque that is generated to counter at least a portion of torque generated by the acceleration of gravity acting on an object with a mass where the object is rotatably coupled to another object. For example, consider the orientation 101 where torque is generated to counter torque generated by the acceleration of gravity acting on the display housing 140 such that angle $\Phi$ remains fixed, optionally without friction at a hinge assembly (e.g., consider a substantially frictionless hinge assembly or relatively low friction hinge assembly).

As an example, a system can include a first housing that includes a processor and memory accessible to the processor; a second housing that includes a display operatively coupled to the processor; and a hinge assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counter-clockwise restoring torque responsive to rotation in a second, opposite rotational direction from the aligned orientation.

FIG. 2 shows a perspective view of the system 100, which may be an apparatus (e.g., a device), where one or more of the hinge assemblies 132-1 and 132-2 include permanent magnets that generate torque that can be a restoring torque that counteracts a torque due to the acceleration of gravity acting upon the display housing 140. In such an example, the angle Φ may be adjustable by a user through use of minimal force. For example, a light touch from a tip of a finger of a user's hand may adjust the angle Φ where, once adjusted, the angle Φ does not change as torques, in opposing directions, can effectively cancel. The system 100 in the example of FIG. 2 may be referred to as a feather touch system in that touch to adjust a housing angle may be quite light.

As an example, a force demand may depend on overcoming a small amount of friction between components without involving a mass lifting force as may be associated with moving a center of mass of an object in a direction that is opposite that of the direction of the acceleration of gravity as such a mass lifting force may be counteracted by a permanent magnet hinge assembly (e.g., or assemblies).

Work can be defined as a product of weight (e.g., mg) and distance. If a display housing has a weight of 2 N (e.g., 0.204 kg multiplied by 9.8 m/s$^2$) and a center of mass that is 0.1 m from a rotational axis (e.g., maximum torque of 0.2 N-m or 20.4 kgf-mm), a rotation of the display housing about the rotational axis by an angular increment that increases the vertical height of the center of mass by 0.02 m against gravity would demand work of approximately 0.04 J. However, if the gravity torque is offset by a magnetic torque (e.g., a restoring torque), then the net torque can be zero and the amount of work performed by a user's hand can be approximately zero.

As to dynamics, a relatively slow adjustment to the angle Φ may be relatively free of velocity related effects such that a user does not experience resistance cause by velocity related magnetic field interactions. As an example, where velocity (change in position in a direction with respect to time) increases, some amount of force may be generated via velocity related magnetic field interactions, which may act to somewhat resist the direction of movement.

In the example of FIG. 2, the mass of the display housing 140 may be reduced when compared to a system that does not include one or more permanent magnet hinge assemblies that can supply a restoring torque. For example, in a system with a friction hinge assembly without permanent magnets, a display housing may be designed with a sufficient amount of structural rigidity to account for a user pushing or pulling on an upper corner of the display housing to open or close the system. As a display may be a relatively fragile component (e.g., akin to a thin plate of glass), the display housing can help to assure that the display does not twist in a manner that could lead to cracking or other damage (e.g., to liquid crystal structures, LED structures, etc.). Where a system includes a permanent magnet hinge assembly that supplies a restoring torque, adjustment of a display housing may be accomplished with little applied force, as illustrated in FIG. 2. As such, the risk of twisting the display housing may be reduced and, hence, fewer, lighter, etc., components may be utilized in constructing the display housing. Such a display housing may be lighter, thinner, etc., which, in turn, may demand lesser strength permanent magnets to generate a restoring force that offsets at least a portion of a gravity force (e.g., F=mg) of the display housing (e.g., a gravity related torque). Further, as the mass of a display housing decreases, the mass of a keyboard housing can decrease as well as the mass to avoid tipping over for angles Φ greater than 90 degrees diminishes. As another example, a system with a magnetic restoring torque hinge assembly may be made with a larger display (e.g., a larger footprint) that would otherwise be at risk of twisting damage when utilized with a friction hinge assembly that does not include permanent magnets that provide a restoring torque.

Referring again to the illustration of FIG. 2, a user may open a laptop computer using one or more fingers, for example, by applying a pinching force at an upper corner of a display housing between a forefinger and thumb while applying a directional force to rotate the display housing by overcoming frictional force at one or more friction hinges. In such an example, the display housing may twist such that the upper corner moves backwards in a plane, which can place a display at risk of damage. In contrast, as shown in FIG. 2, where one or more permanent magnet hinge assemblies are utilized to supply a restoring torque, a single fingertip may be utilized, which may be positioned in a manner such that a fingerprint is not left on a display of a display housing (e.g., consider a "frameless" display that extends to borders of a display housing). In such an example, ergonomics are improved, user experience is improved and, for example, depending on extent of a display, a risk of leaving a fingerprint on the display can be reduced.

Figure 3A:
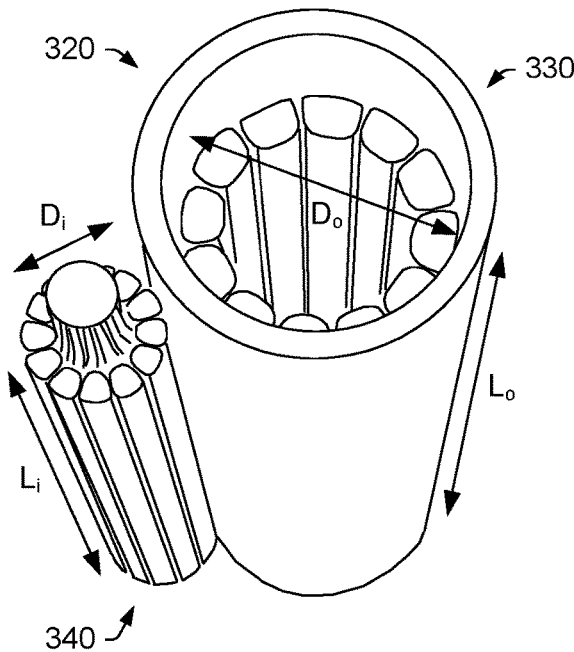
FIG. 3A, FIG. 3B and FIG. 3C are a series of diagrams of an example of a hinge assembly.
Figure 3C:
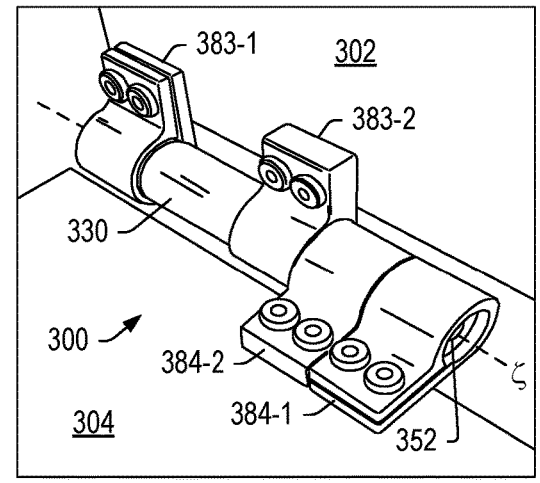
Figure 3B:
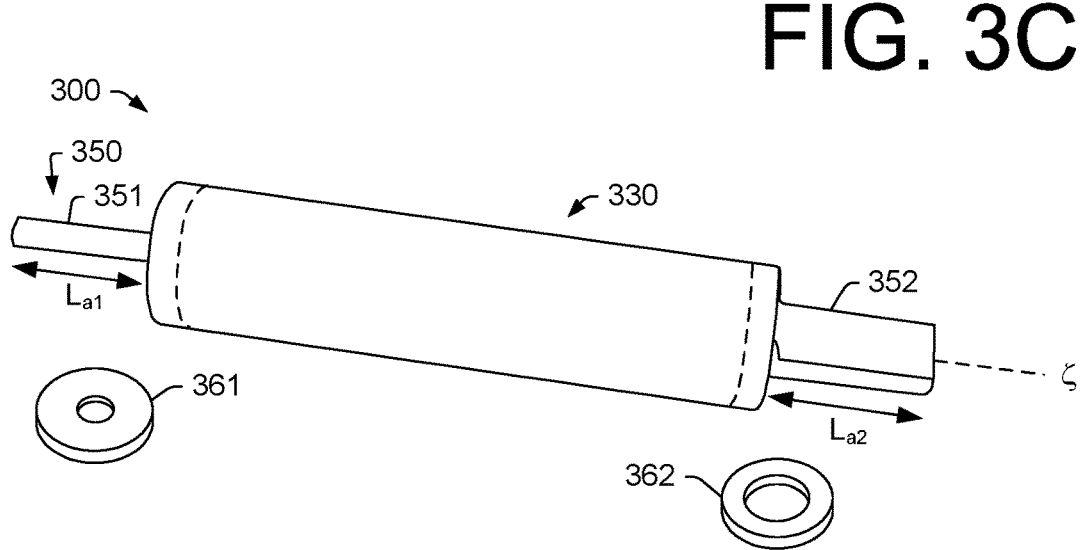

FIG. 3A and FIG. 3B show perspective views of examples of permanent magnets 320 and 340 that can be arranged to form an example hinge assembly 300, which can be a permanent magnet hinge assembly that supplies a restoring torque. As shown, the permanent magnets 320 and 340 are radially arranged where an axle 350 can support permanent magnetic material and where a casing 330 can support permanent magnetic material.

As shown, the permanent magnets 320 and 340 can be concentrically arranged along a common rotational axis where a first portion of the axle 350 is supported by a first bushing or bearing 361 and where a second portion of the axle 350 is supported by a second bushing or bearing 362. The bushings or bearings 361 and 362 may be of a common size and of common specifications or they may differ. As an example, one or more of the bushings or bearings 361 and 362 may be relatively frictionless (e.g., relatively low friction) such that friction force is small compared to forces generated by rotation of the permanent magnets 320 and 340 with respect to each other about the common rotational axis, which can be defined by an angle such as an angle α. For example, the angle α may be equal to zero when magnetic fields of the permanent magnets 320 and 340 are aligned. In such an example, consider the casing 330 supporting magnetic material that forms the permanent magnet 320 (e.g., or magnets) with a single north pole and a single south pole and the axle 350 supporting magnetic material that forms the permanent magnet 340 (e.g., or magnets) with a single north pole and a single south pole where the south pole of the permanent magnet 340 is aligned with the north pole of the permanent magnet 320. In such an alignment, the permanent magnets 320 and 340 can be defined to be in a stable steady state; whereas, if the south pole of the permanent magnet 340 is aligned with the south pole of the permanent magnet 320, the permanent magnets 320 and 340 can be defined to be in an unstable steady state. In an unstable steady state, a rotational perturbation can cause the alignment to transition from the unstable steady state to the stable steady state.

In the example of FIG. 3A and FIG. 3B, various dimensions are shown, which include a length $L_i$ and a diameter $D_i$ of the permanent magnet 340 and a length $L_o$ and a diameter $D_o$ of the permanent magnet 320. Further, the axle 350 is shown as including a first portion 351 with a length $L_{a1}$ and a second portion 352 with a length $L_{a2}$. The first portion 351 may be received via a bore in the first bushing or bearing 361 and rotatably supported therein in and the second portion 352 may be received via a bore in the second bushing or bearing 362 and rotatably supported therein. As shown in FIG. 3A and FIG. 3B, the length $L_i$ can be greater than $D_i$ and the length $L_o$ can be greater than $D_o$.

FIG. 3C shows the hinge assembly 300 operatively coupled to a first housing 302 and a second housing 304 via fittings 383-1, 383-2, 384-1 and 384-2. As shown, the fittings 383-1 and 383-2 can secure the casing 330 to the first housing 302 and the fittings 384-1 and 384-2 can secure the axle 350 to the second housing 304. In the example of FIG. 3C, the first portion 351 of the axle 350 may be shorter axially than the second portion 352 of the axle 350, where the second portion 352 is sufficiently long to provide a surface to be secured via one or more fittings such as the one or more fittings 384-1 and 384-2. As shown, a fitting may be a fix fitting, a guide fitting or a fitting may be an adjustable fitting. A guide fitting (see, e.g., the fittings 383-2 and 384-2) may guide a component along an axis while an adjustable fitting may allow for clamping a component and unclamping a component where, in an unclamped state, the component is translatable axially and/or rotatable azimuthally. For example, an assembly process may orient the housings 302 and 304 according to an angle (e.g., $\Phi$=90 degrees or $\alpha$=0 degrees, etc.) where the casing 330 and the axle 350 are fixed and/or clamped (e.g., via the fittings 383-1 and 384-1, respectively) such that the permanent magnets 320 and 340 are in a stable steady state.

Given definitions of a stable steady state and an unstable steady state, an intermediate state can be defined as corresponding to an orientation that is not that of the stable steady state and not that of the unstable steady state. In an intermediate state, there can be torque, which may be in one of two directions (e.g., acting clockwise or acting counterclockwise). For example, if the stable steady state is at an angle $\alpha$ equal to zero degrees and the unstable steady state is at an angle $\alpha$ equal to 180 degrees, then an intermediate state is an angle $\alpha$ that is not equal to zero degrees and not equal to 180 degrees.

Figure 4A:
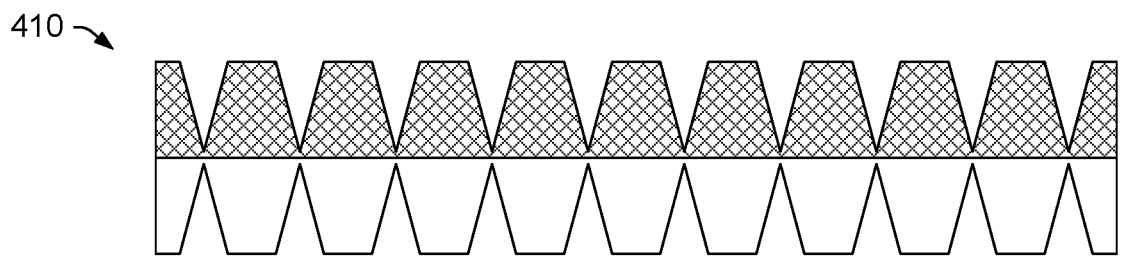
FIG. 4A and FIG. 4B are a series of diagrams of examples of one or more magnets.
Figure 4B:
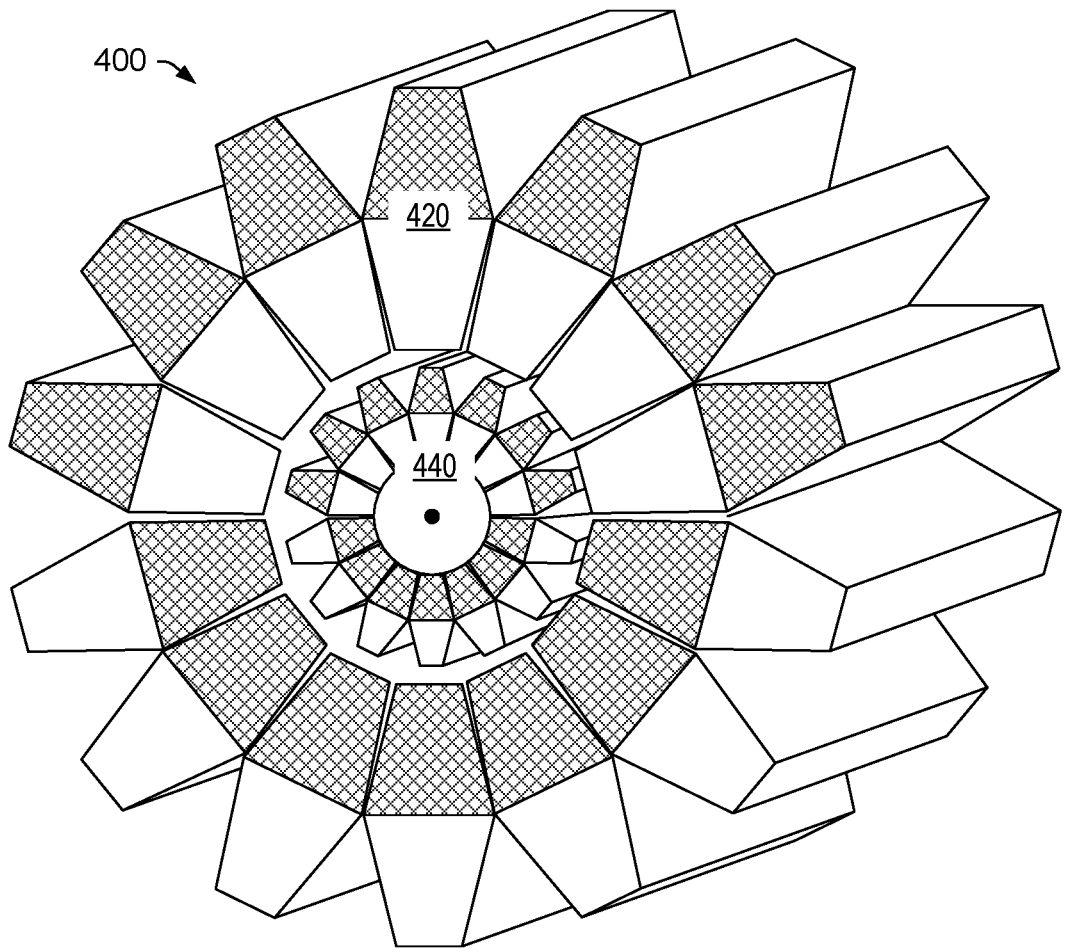

FIG. 4A and FIG. 4B show examples of a permanent magnet or permanent magnets 410, which may be magnetic material or magnetic materials that can form a stator 420 and rotor 440 arrangement 400. As shown, the arrangement 400 is in a stable steady state orientation as poles are aligned. In such an example, a rotation of the rotor 440 in a clockwise direction toward the unstable steady state orientation will generate torque on the rotor 440 in a counterclockwise direction. In such an example, the generated torque can be defined as a restoring torque that acts to restore the rotor 440 to the stable steady state orientation.

As to the permanent magnet or permanent magnets 410, consider a formed plate with appropriate cutouts that allow for formation of a radial arrangement or consider a series of elements that allow for formation of a radial arrangement. As shown, the permanent magnet or permanent magnets 410 may be formed into an arrangement with an inward north pole and outward south pole or with an inward south pole and an outward north pole.

As an example, one or more permanent magnets may be formed from material that can be magnetized (e.g., ferromagnetic material, etc.). For example, consider shaping material into a desired shape for a permanent magnet hinge assembly and then magnetizing the shaped material. As an example, a direct, an indirect or a direct and indirect approach may be utilized to form a permanent magnet.

As to a direct approach, as an example, current can be passed directly through material. Such an approach may involve clamping the material between two electrical contacts where current is passed through the material and a circular magnetic field is established in and around the material. When the magnetizing current is stopped, a residual magnetic field can remain within the material where the strength of the induced magnetic field can be proportional to the amount of current passed through the material.

As to an indirect approach, a strong external magnetic field may be utilized to establish a magnetic field within the material. Such an approach may utilize one or more of a permanent magnet, an electromagnet, a coil, a solenoid, etc. For example, consider a material that is placed longitudinally in a concentrated magnetic field that fills a center of a coil or solenoid.

Figure 5A:
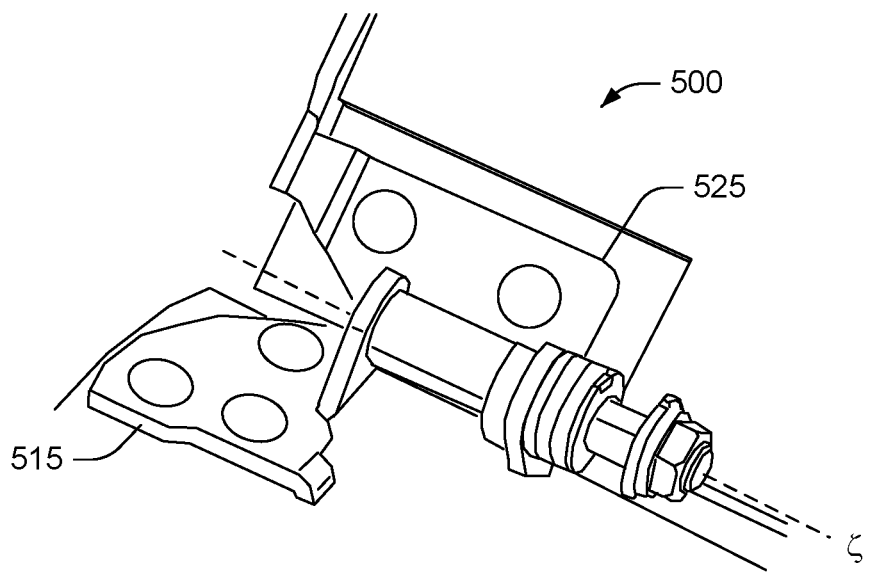
FIG. 5A and FIG. 5B are a series of diagrams of an example of a hinge assembly.
Figure 5B:
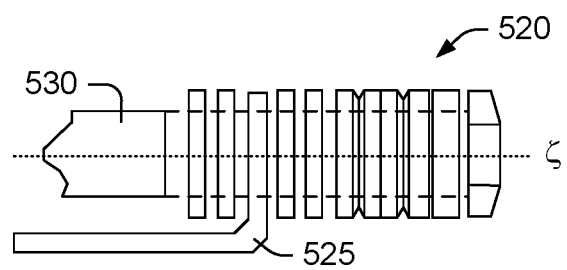

FIG. 5A and FIG. 5B show an example of a hinge assembly 500 that includes a saddle 515 and a saddle 525 with respect to a hinge post 530 and various components 520. The components 520 may include a screw nut, a dowel plate, disk type leaf springs, packing, etc. As an example, the hinge assembly 500 may include one or more friction elements to form a friction hinge assembly. As an example, the hinge assembly 500 may include permanent magnets such as the permanent magnets of FIG. 3A and FIG. 3B, FIG. 4A and FIG. 4B, etc. In such an approach, a desired amount of friction may be introduced, which may be for ergonomic purposes, for example, to provide a user with a particular amount of resistance to movement of a housing with respect to another housing; noting that the friction introduced can be substantially less than a friction required to counteract a lever arm under the acceleration of gravity. In such an approach, an amount of friction may be a "feel" friction for ergonomic reasons rather than a holding friction for static reasons. As an example, a system can include one or more permanent magnet hinge assemblies and one or more friction hinge assemblies or one or more hybrid hinge assemblies (e.g., permanent magnets with one or more friction elements).

Figure 6A:
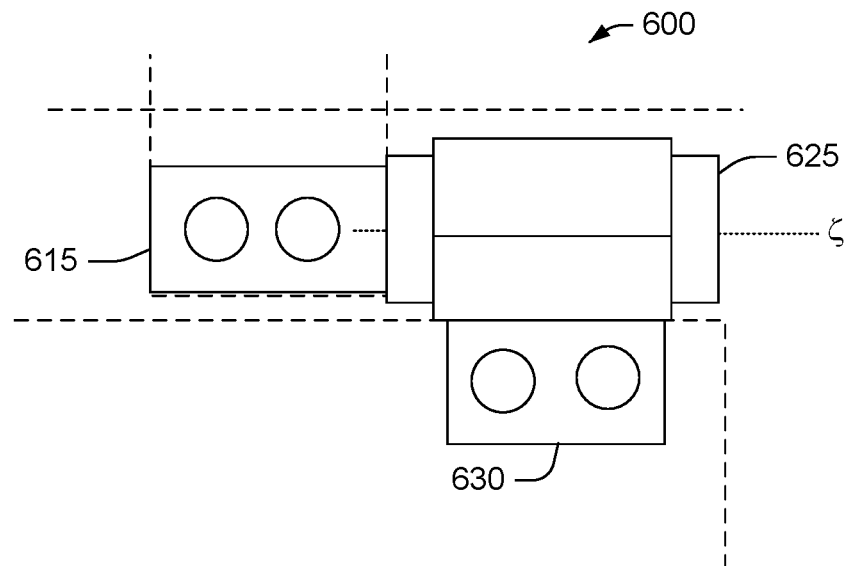
FIG. 6A and FIG. 6B are a series of diagrams of an example of a hinge assembly.
Figure 6B:
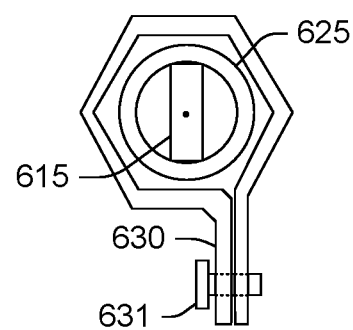

FIG. 6A and FIG. 6B show an example of a hinge assembly 600 that includes a hinge post 625 along with connector portions 615 and 630, where dashed lines indicate some example housings or housing couplings. In the example hinge assembly 600, permanent magnets may be included along with one or more friction elements. The hinge assembly 600 may be a permanent magnet hinge assembly, a friction hinge assembly or a hybrid hinge assembly. As shown in the example of FIG. 6A and FIG. 6B, one or more bolts 631 and/or one or more other types of components may be utilized to secure a connector portion and a housing, a base, etc., such that a hinge assembly can rotatably couple a housing to another housing, to a base, etc. As an example, a component may provide for adjustment of a portion of a hinge assembly, for example, consider clamping where a clamping force may be adjusted.

In various examples, a hinge assembly can include a connector portion that is a leaf (e.g., a hinge leaf), which can rotate a number of degrees around an axle (e.g., a pin) and may be an extension of a knuckle (e.g., integral, attached, etc.), where a knuckle can form a hollow part at a joint of a hinge (e.g., a hinge bore) in which an axle (e.g., a pin) is received. As an example, the saddle 515 can be a leaf, the saddle 525 can be a leaf, the connector portion 615 can be a leaf, and/or the connector portion 630 can be a leaf.

As explained, a hinge assembly can be a friction hinge assembly where one or more components can provide for adjustment of friction force. In the example of FIGS. 5A and 5B, various components may be disposed about a portion of an axle and adjustably tightened or loosened to adjust friction force. In the example of FIG. 6A and FIG. 6B, the connector portion 630 may be configured as a clamp such as a wrap strap where a single piece of material is shaped with a bore portion and tab ends where the tab ends can be brought close together to reduce a diameter of the bore portion. In such an example, each of the tab ends can include an opening through which a bolt or another type of component is passed that can be utilized to secure the connector portion 630 to a housing (e.g., or a base, etc.) and/or to adjust friction force.

As explained, a system can include a magnetic hinge assembly and may include another type of hinge assembly. For example, consider a left side magnetic hinge assembly and a right side guide hinge assembly, which may be relatively frictionless (e.g., low friction) or of an adjustable or fixed friction. As another example, consider a right side magnetic hinge assembly and a left side guide hinge assembly, which may be relatively frictionless (e.g., low friction) or of an adjustable or fixed friction. In such examples, a guide hinge assembly may be provided to help guide rotation of a housing. As yet another example, consider a magnetic hinge assembly disposed between two guide hinge assemblies (e.g., left and right guide hinge assemblies). In such an example, the magnetic hinge assembly may provide a restoring torque while the guide hinge assemblies provide for alignment (e.g., along an axis). In such an example, the magnetic hinge assembly may be contactless where an axle (e.g., a shaft) is rotatably supported by both of the guide hinge assemblies. In such an approach, the support provided by the bushings or bearings 361 and 362 with respect to the casing 330 and the axle 350 in the example of FIG. 3B may be provided by the guide hinge assemblies.

Figure 7:
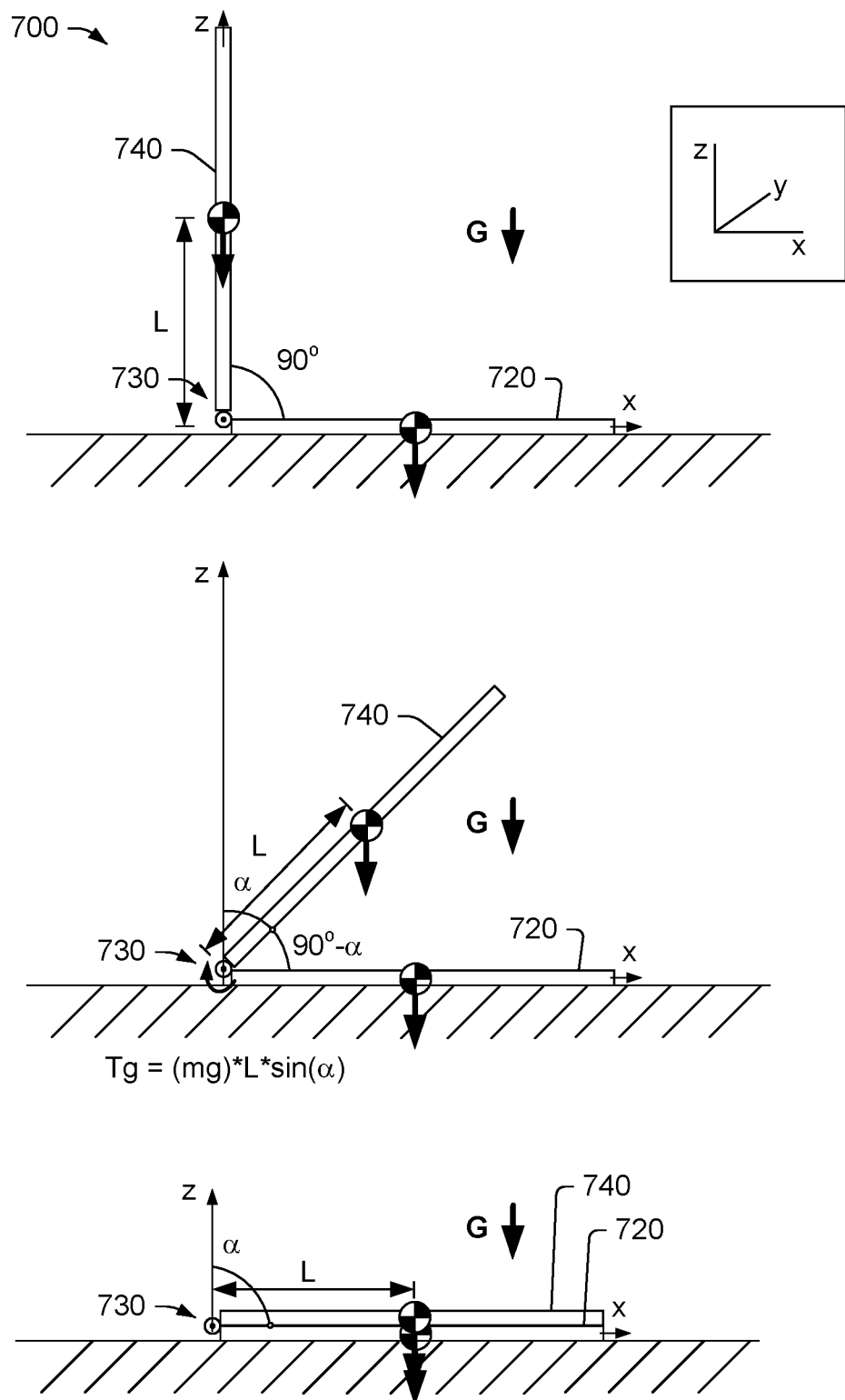
FIG. 7 is a series of diagrams of an example of a system and an example of a method for transitioning the system.

FIG. 7 shows an example of a system 700 that includes housings 720 and 740 rotatably coupled via a hinge assembly 730. In the example of FIG. 7, center of mass (e.g., which may correspond to a center of gravity of a housing) symbols are shown where, for the housing 740, a length L is shown as a lever arm length. In FIG. 7, an equation is given for gravity related torque Tg as follows:

$$Tg = (mg)*L*\sin(\alpha)$$

In the foregoing equation, m is the mass of the housing 740 and α is an angle measured from vertical, where the housing 720 is supported on a horizontal surface. As shown, in the top orientation, torque is zero as the angle α is 0 degrees such that the lever arm is aligned with gravity; whereas, in the bottom orientation, torque is at a maximum as the housing 740 is horizontal and substantially parallel with the housing 720, which may correspond to the angle α being approximately 90 degrees. In the middle orientation, the angle α is between 0 and 90 degrees such that the term sin(α) is neither zero nor unity where torque due to gravity can be approximated by the foregoing equation.

As an example, in a closed orientation (bottom orientation in FIG. 7), one or more magnets may be utilized to help maintain the system 700 in the closed orientation. For example, consider a magnet in the housing 720 and a ferromagnetic material in the housing 740 that align in the closed orientation such that a magnetic attraction force is established, which may help avoid undesirable opening of the housings (e.g., during transport, etc.). Such a magnetic attraction force may be relatively small and overcome by manual force such as, for example, a force applied by a fingertip to lift the housing 740 away from the housing 720. Once the housing 740 is rotated a small distance away from the housing 720 (e.g., an arc distance corresponding to a few degrees of rotation such as, for example, 3 to 5 degrees Φ), the magnetic attraction force can be sufficiently weak and negligible. When a user wants to transition the system to the closed orientation, the user can move the housing 740 toward the housing 720 where, at the relatively small distance, the magnetic attraction force can "take over" and transition the system to the closed orientation, which may be considered a closed and secured orientation. As an example, a "snap" action or a more viscous, damped action may occur for angles of Φ less than approximately 10 degrees. Such an action may occur at an angle that is deemed to be an indicator angle that a user wants to transition the system to a closed orientation rather than merely an out-of-view angle of a display (e.g., such that others do not see screen content). As an example, a magnetic attraction force may commence at an angle that corresponds to a trigger angle of a system for transitioning a system to a lower power state (e.g., a sleep state, a shutdown state, etc.). In such an example, a greater angle may indicate that a user merely wants to hide a display from view without necessarily making a power state transition.

Figure 8:
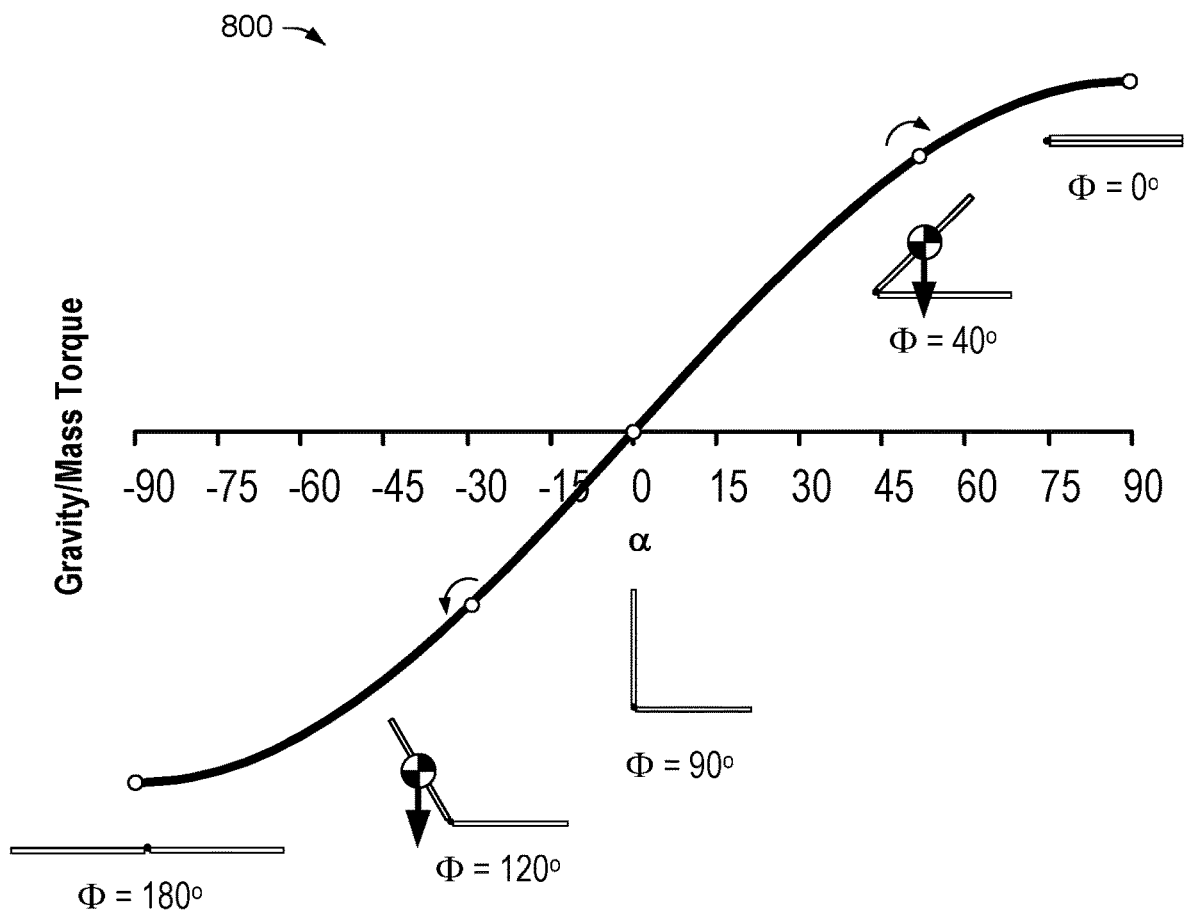
FIG. 8 is a diagram of an example plot.

FIG. 8 shows an example plot 800 of gravity or mass torque versus angle α over a range from −90 degrees to +90 degrees. Example system graphics are also illustrated showing values of an angle Φ where one of the two housings remains horizontal. In the example of FIG. 8, the plot 800 shows torque that is sinusoidal in shape with respect to angle. For example, the torque may be represented using a sine function, as mentioned with respect to FIG. 7.

Figure 9:
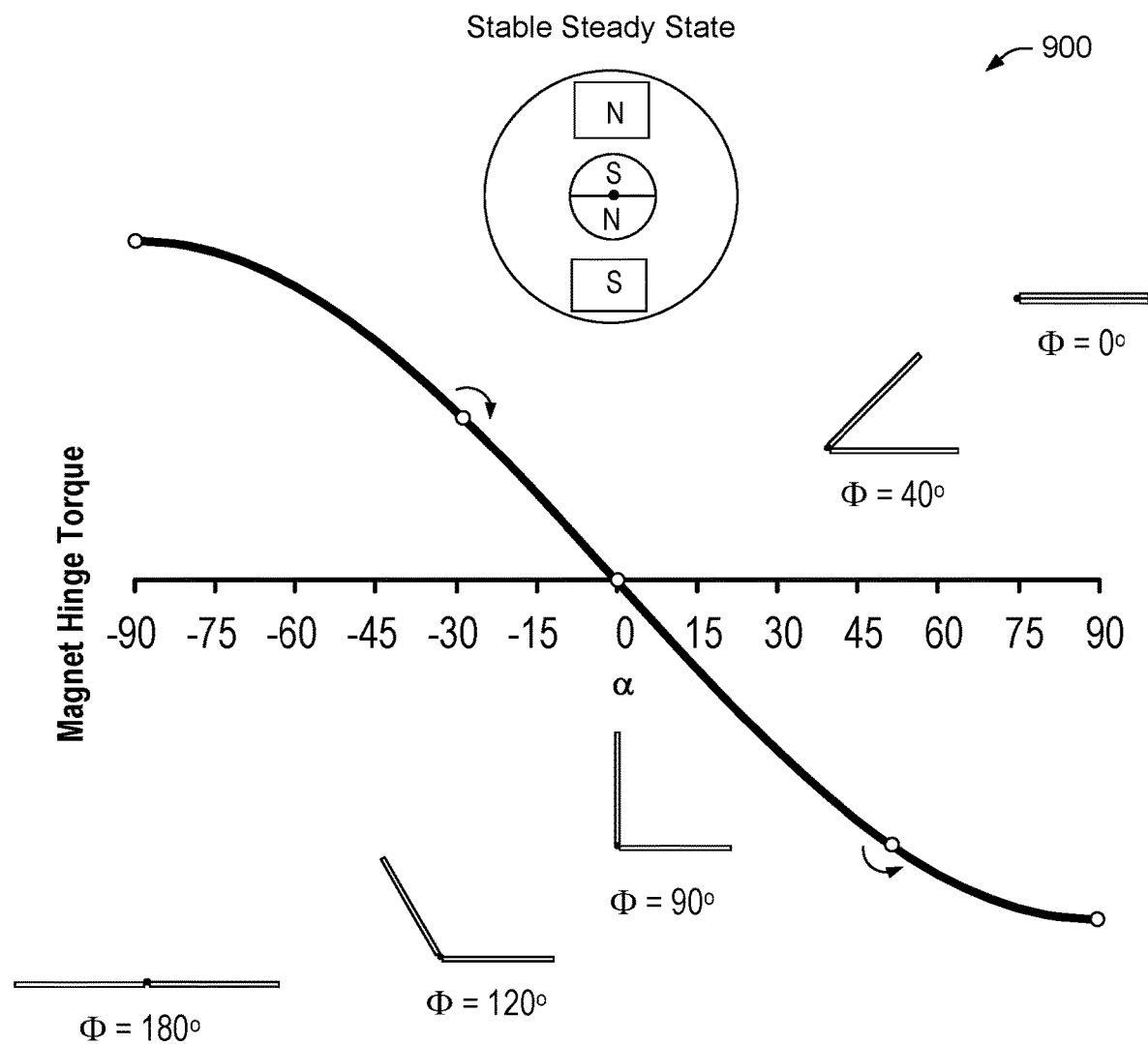
FIG. 9 is a diagram of an example plot.

FIG. 9 shows an example plot 900 of magnetic torque versus angle α over a range from −90 degrees to +90 degrees. As indicated, 0 degrees corresponds to a stable steady state. Example system graphics are also illustrated showing values of an angle Φ where one of the two housings remains horizontal. In the example of FIG. 9, the plot 900 shows torque that is sinusoidal in shape with respect to angle. For example, the torque may be represented using a sine function where a restoring torque is clockwise over a range of angles and where a restoring torque is counter-clockwise over a range of angles.

Figure 10:
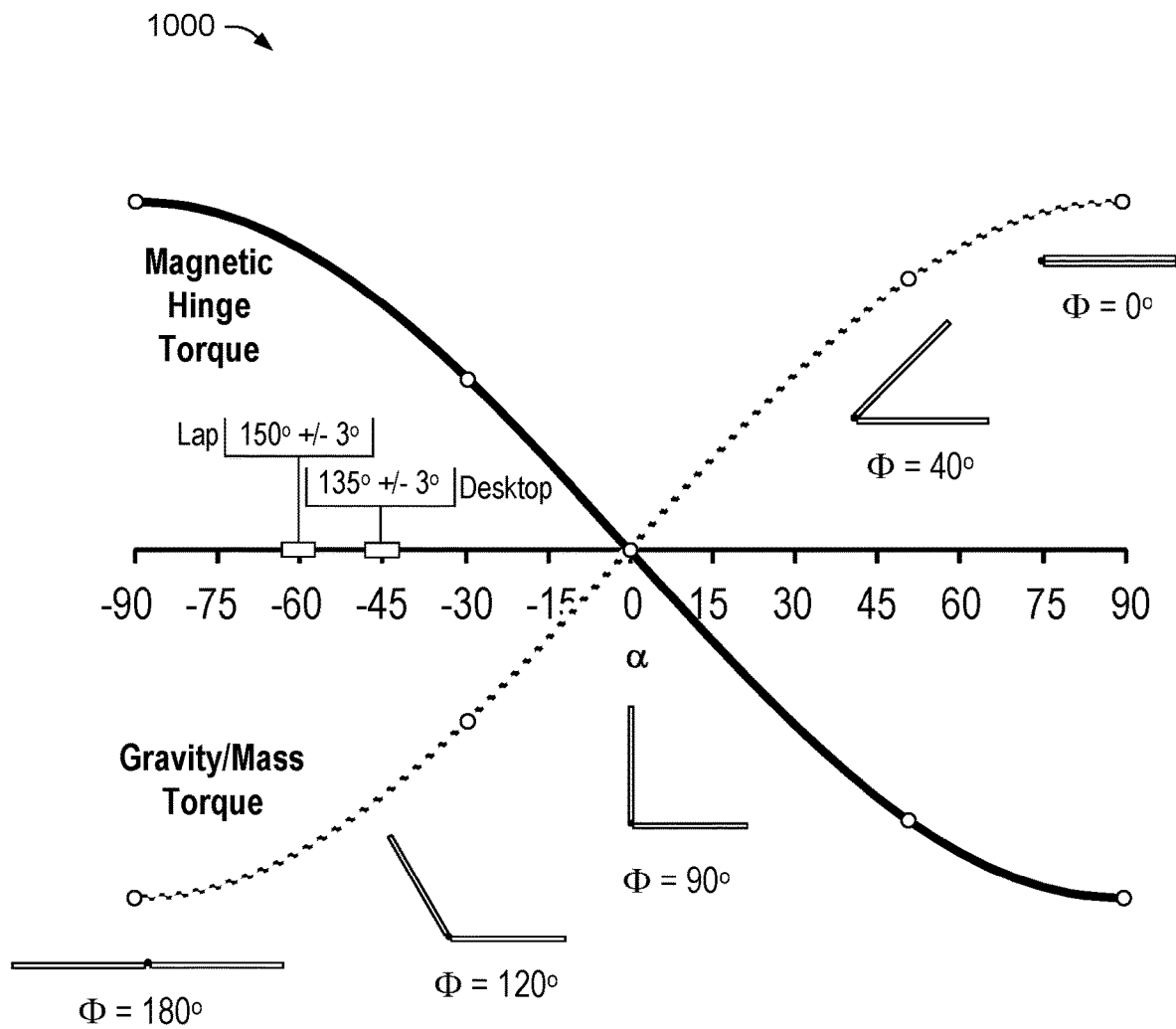
FIG. 10 is a diagram of an example plot.

FIG. 10 shows an example plot 1000 of magnetic torque and gravity or mass torque versus angle α over a range from −90 degrees to +90 degrees. As indicated, α equal to 0 degrees corresponds to a stable steady state. As shown, the torques can, at least theoretically, cancel. Example system graphics are also illustrated showing values of an angle Φ where one of the two housings remains horizontal. As explained with respect to FIG. 2, in such an approach, a user may adjust an angle between housings (e.g., the angle Φ) using an extremely light touch.

As an example, a system may include a hinge assembly that is operable over a range of angles with a magnetic related torque (e.g., a restoring torque). For example, consider a range of angles that includes angles less than α=0 and that includes angles greater than α=0. For example, consider −75 degrees to +75 degrees, −60 degrees to +60 degrees, −45 degrees to +45 degrees, −30 degrees to +30 degrees, etc. As an example, a magnetic related torque (e.g., a restoring torque) can be sinusoidal in that it can form a portion of a sine function (e.g., plotted versus angle).

As an example, touch may be quantified in newtons, which may be at a level of centi-newtons (cN). For example, a keyboard that has a rather higher actuation force may be rated at 50 cN. As an example, an adjustment force may be of the order of tens of centi-newtons or, optionally, less than 10 cN.

As an example, a housing may be adjustable according to various types of forces, which can include one or more of a preload, a tactile force and an actuation force. As to keyboards, preload is the force required to begin depressing a key. This force arises from partial compression of the spring by the switch at rest: when a switch is assembled, the spring may be compressed by a certain amount by the space inside the switch being shorter than the spring. Preload can be seen by a force curve having a force intercept greater than zero. Preload can help to prevent a key from having a loose, slack feel, especially for people who rest their fingers on the keys. Tactile force, for tactile switches (e.g., including clicky but not linear switches), is the force required to overcome a tactile peak in a force curve. This force may be mechanically unrelated to operation of switch contacts and serve to provide feedback to an operator. Switch actuation may be intended to occur just after this point, when the force level drops off, using the momentum gained to propel a slider forward to an actuation point. As to actuation force, it is the force required to actuate a switch (e.g., to cause it to register a key press). In linear switches, it can set an amount of pretravel required (e.g., how far the switch must be pressed for it to register). In various instances, tactile force can exceed actuation force; noting that linear switches have no notion of tactile force.

As an example, a system can include a keyboard with keys rated according to one or more forces, which can include an actuation force. As an example, a system can include one or more magnetic hinge assemblies that rotatably couple two housings where an adjustment in angle between the two housings can be achieved using a force that is less than the actuation force of keys of a keyboard of the system (e.g., where one of the housings is a keyboard housing and the other housing is a display housing where the force is an adjustment force to adjust the display housing where the keyboard housing remains stationary). In such an example, the system itself can demonstrate whether or not the adjustment force is less than the actuation force.

Figure 11:
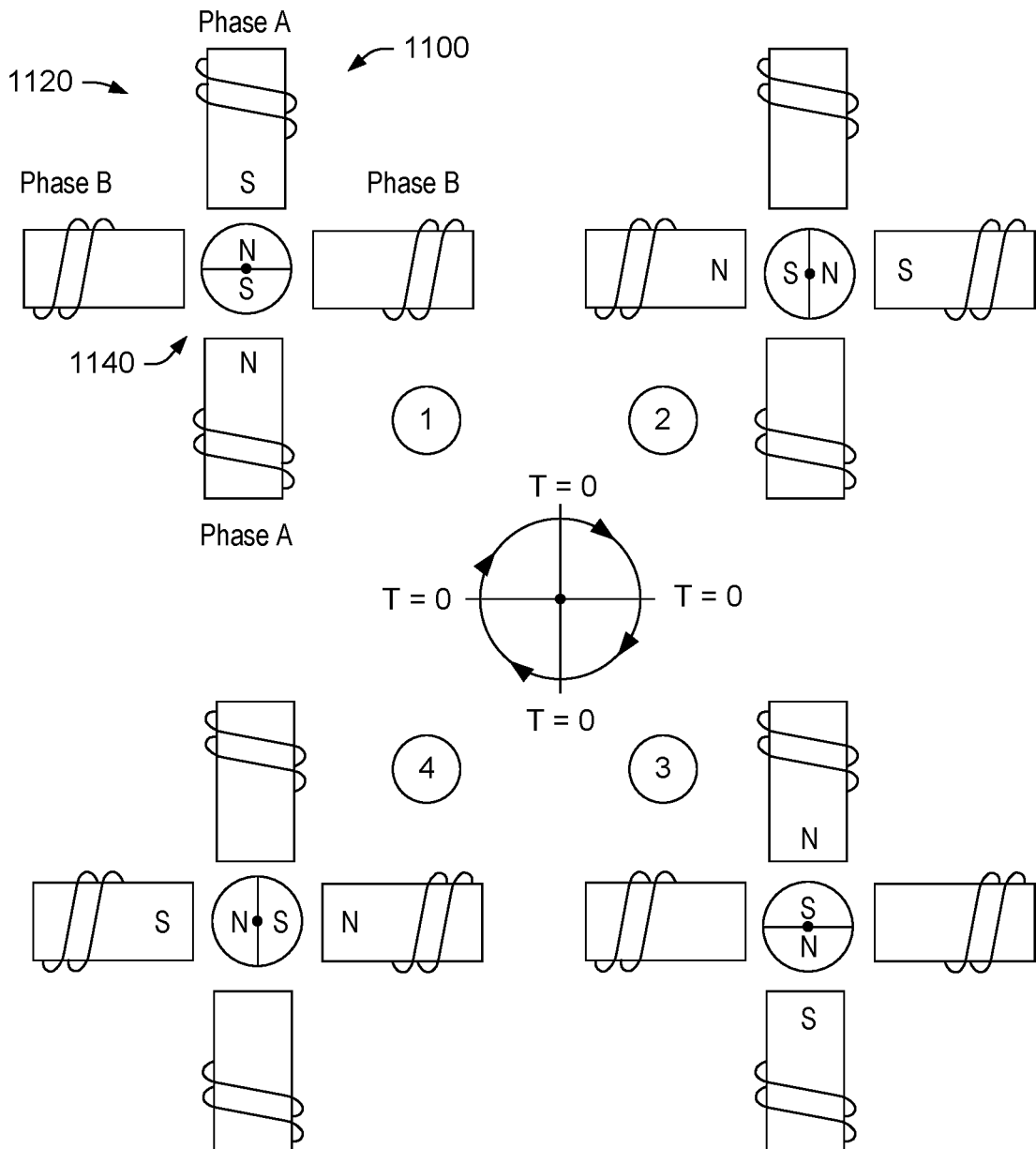
FIG. 11 is a diagram of an example of a two-phase stepper motor.

FIG. 11 shows an example of a two phase (phase A and phase B) stepper motor 1100 with a stator 1120 and a rotor 1140 where phase A or phase B may be activated to cause the rotor 1140 to rotate. As shown, the rotor 1140 can be a permanent magnet that can be rotated at 90 degree increments in a clockwise direction.

Figure 12A:
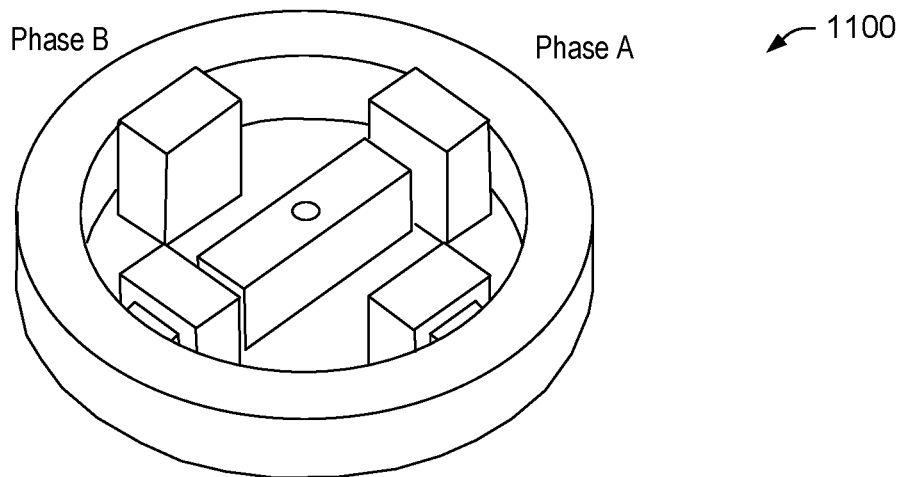
FIG. 12A and FIG. 12B are a series of diagrams of an example of a two-phase stepper motor and an example plot.
Figure 12B:
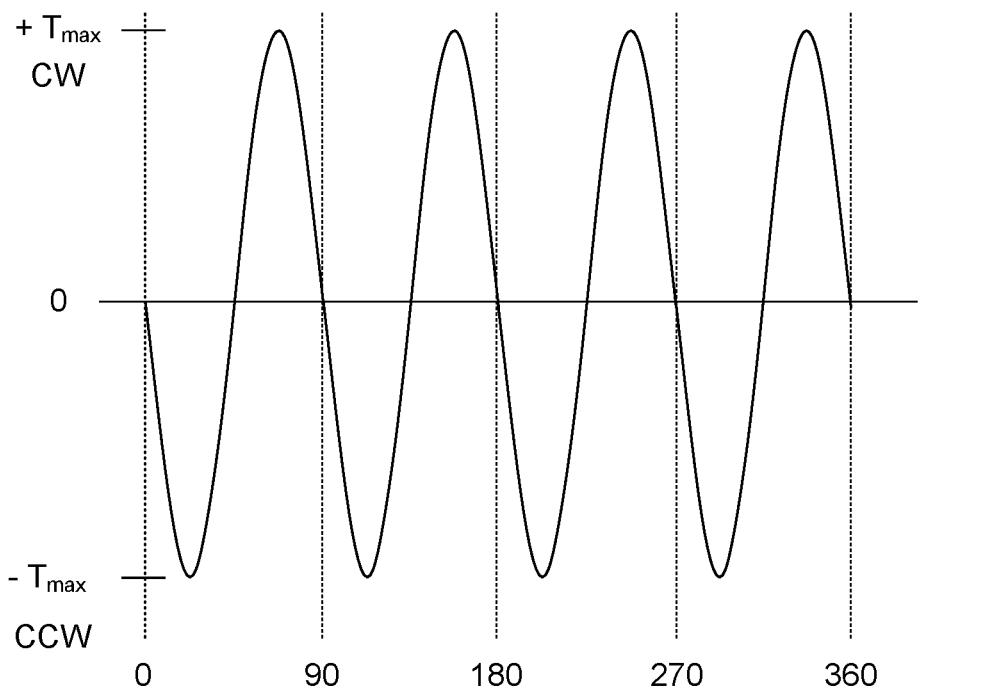

FIG. 12 shows another view of the stepper motor 1100 along with a plot 1200 of no current torque, which may be referred to as cogging torque or detent torque. Such torque can be detrimental to operation of a stepper motor. As shown in the plot 1200, for the two phase stepper motor 1100, the no current torque exhibits a sine function with a full cycle every 90 degrees. Operation of a stepper motor must account for such no current torque, which can be detrimental to operation; noting that a stepper motor is generally intended to be operable in any orientation with respect to gravity.

FIG. 13 shows an example of a system 1300 with reference to states of a compass 1390 influenced by the magnetic field of the Earth. As shown, the system 1300 includes housings 1320 and 1340 rotatably coupled by a hinge assembly 1330. As to the compass 1390, it is shown in a north pointing stable steady state of the compass needle, an east pointing intermediate state of the compass needle where magnetic force urges the needle counterclockwise toward the north pointing stable steady state (e.g., a restoring force) and a west pointing intermediate state of the compass needle where magnetic force urges the needle clockwise toward the north pointing stable steady state (e.g., a restoring force).

A compass needle can be considered to be a magnetic dipole, having a single north pole and a single south pole. A compass needle can be supported on a relatively frictionless mount or spindle such that force of the Earth's magnetic field can cause the compass needle to be in a stable steady state. In various instances, a compass needle can be floating and may be in the form of a floating needle, which may be shaped differently than a needle (e.g., a sphere, a disc, etc.). Where a compass needle is in an unstable steady state (e.g., perfectly anti-aligned with the Earth's magnetic field), a perturbation to the compass needle (e.g., clockwise or counterclockwise) will result in force acting to transition the compass needle to the stable steady state.

A compass is generally operable in a horizontal orientation where the acceleration of gravity may act upon a compass needle evenly about its extent such that the center of mass is aligned with the rotational axis of the compass needle. For example, a compass can be oriented in a plane where the acceleration of gravity is normal to the plane. However, for a compass to work properly, the compass needle must be free to rotate and align with the magnetic field, which can have a declination angle (pointing downward into the Earth). A difference between compasses designed to work in the northern and southern hemispheres can be in the location of a balance weight that is placed on the needle to ensure it remains in a horizontal plane and hence free to rotate. In the northern hemisphere, the magnetic field dips down into the Earth so the compass needle has a weight on the south end of the needle to keep the needle in the horizontal plane; whereas, in the southern hemisphere, the weight is positioned on the north end of the needle.

As explained, a compass operates under the influence of the Earth's magnetic field, which can be measured in tesla or gauss, for example, the strength of the field at the Earth's surface ranges from less than 30 microteslas (0.3 gauss) in an area including most of South America and South Africa to over 60 microteslas (0.6 gauss) around the magnetic poles in northern Canada and south of Australia, and in part of Siberia.

Figure 14:
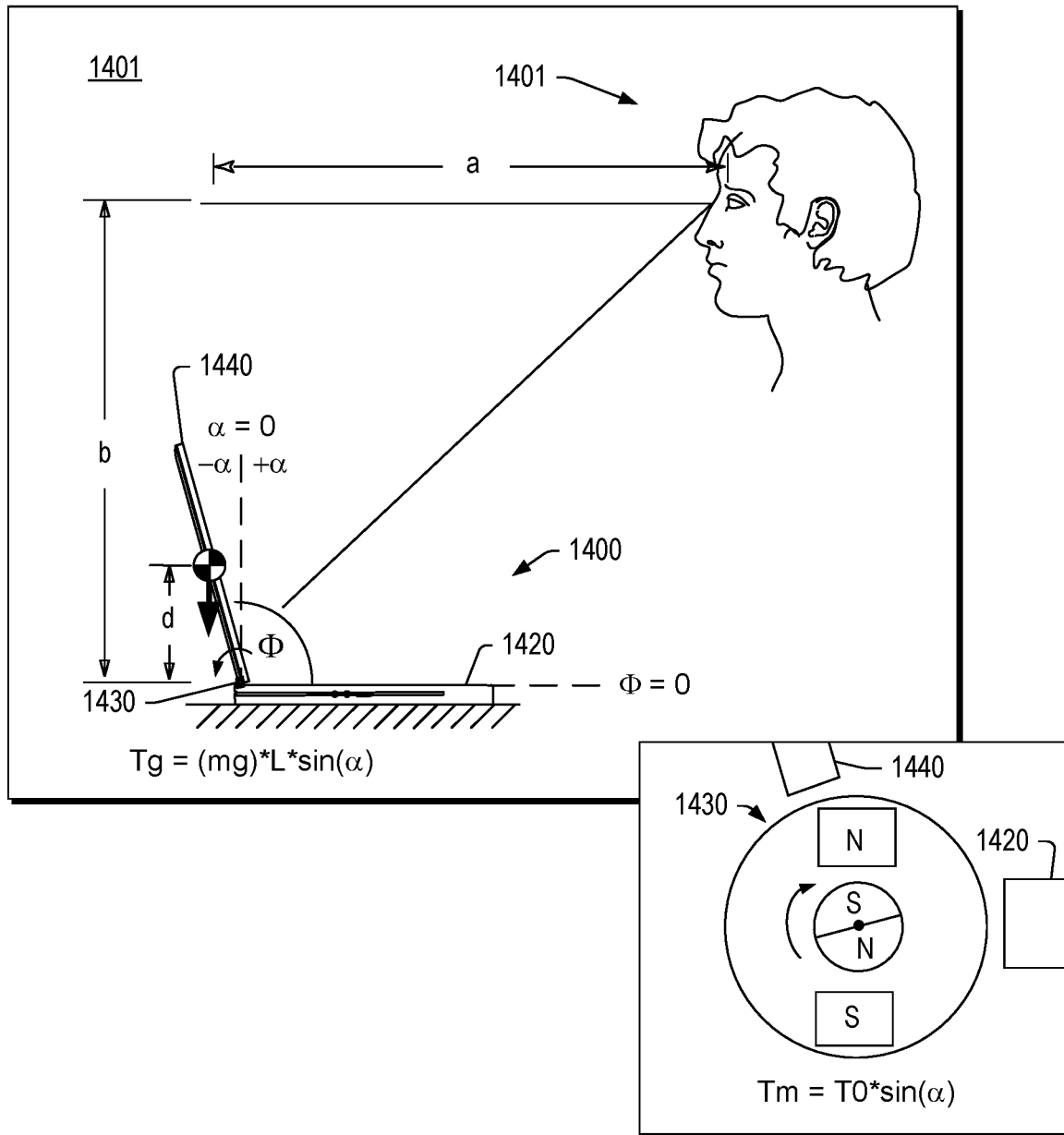
FIG. 14 is a diagram of an example of a system in an example scenario.

FIG. 14 shows an example of a system 1400 with housings 1420 and 1440 in a scenario where eyes of a user 1401 are positioned a horizontal distance a from a rotational axis of a hinge assembly 1430 and a vertical distance b above the rotational axis, where a center of mass of the housing 1440 is a vertical distance d above the rotational axis, where L, as a lever arm, can be defined as the hypotenuse of a triangle with a height equal to the vertical distance d. In the example of FIG. 14, the hinge assembly 1430 can include permanent magnets where a dipole is tilted at an angle within a primary field such that the hinge assembly 1430 counteracts at least a portion of the gravity related torque of the housing 1440 about the rotational axis.

As shown in FIG. 14, the gravity torque can depend on mass, m, gravity, g, lever arm, L, and sine of the angle $\alpha$ while the magnetic torque can depend on a torque T0 and sine of the angle $\alpha$, where the gravity torque and the magnetic torque can be opposite in directions about an axis of a hinge assembly such that the magnetic torque acts as a restoring torque that counteracts the gravity torque. As an example, where the angle $\alpha$ is 90 degrees, $\sin(\alpha)$ equals one. For a balanced arrangement, T0 can be equal to the product mgL (e.g., where m and L may be fixed and constant) but in an opposite direction about an axis of a hinge assembly.

As explained, a stable steady state of permanent magnets can be set to a position where gravity torque is zero. In such an example, the permanent magnets of a hinge assembly may define two dipoles, akin to the Earth's dipole and the dipole of a needle of a compass, where the two dipoles are within a concentric cylinder type of arrangement aligned along a common axis where an outer cylinder and/or an inner cylinder may rotate about the common axis to be in a stable steady state or in an intermediate state and, for example, depending on arrangement, an unstable steady state.

As explained with respect to FIG. 2, a user such as the user 1401 of FIG. 14 may utilize a finger (e.g., a fingertip) to adjust the angle Φ where the force applied may be relatively low, for example, less than an actuation force of a key of a keyboard such as a key of a keyboard of the housing 1420, which is shown as being positioned on a substantially horizontal surface (e.g., a desk surface, a table surface, a countertop surface, etc.).

Figure 15:
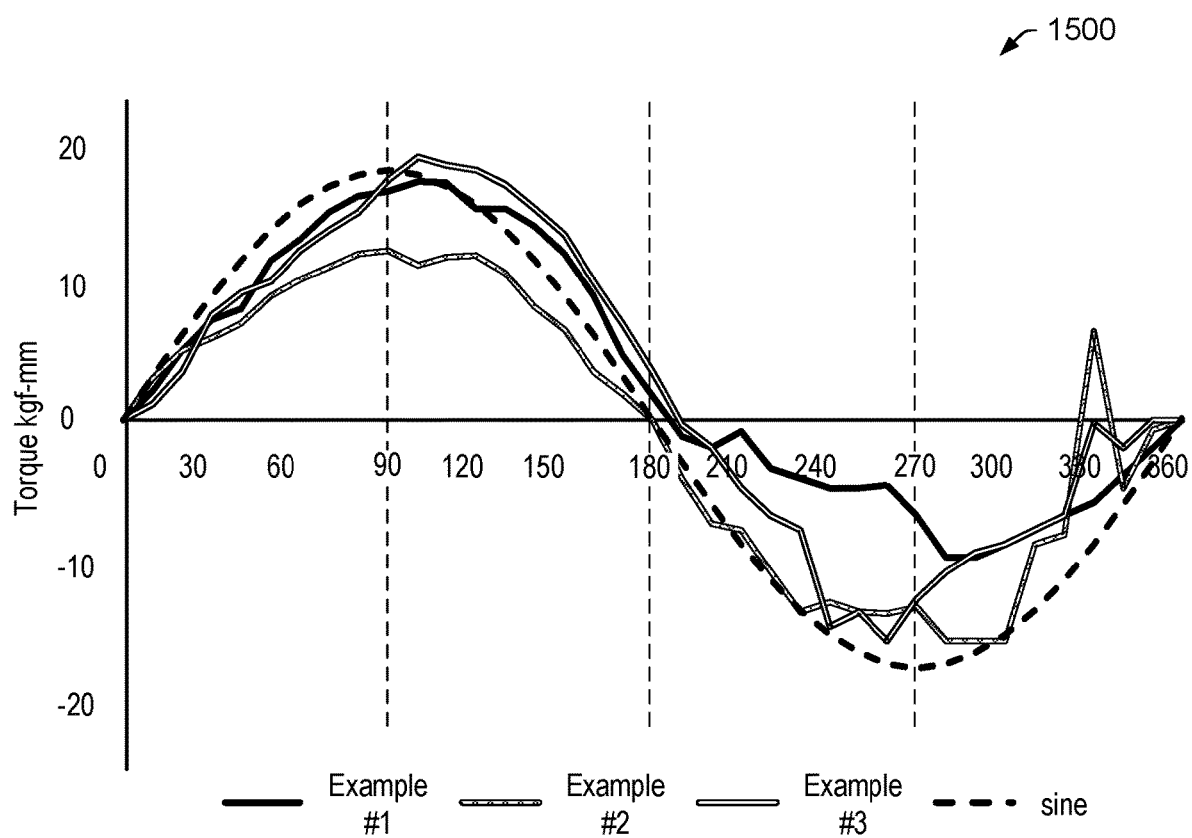
FIG. 15 is a diagram of an example plot.

FIG. 15 shows a plot 1500 of torque versus angle for three example hinge assemblies configured as shown in the example of FIG. 3A and FIG. 3B with respect to a sine function. As shown, a positive torque of approximately 20 kgf-mm and a negative torque of approximately 20 kgf-mm can be achieved for approximately 90 degree rotations from approximately 180 degrees (see, e.g., 90 degrees and 270 degrees).

Consider the example system 700 of FIG. 7 and the equation:

$$Tg=(mg)*L*\sin(\alpha)$$

If the mass of the housing 740 is 0.1 kg and the length L is 0.1 m, with an assumed acceleration of gravity of 10 m/s², then the maximum gravity related torque is approximately 0.1 N-m, which is approximately 10.2 kgf-mm (e.g., 1 N-m equals 101.97 kgf-mm). If a system includes two hinge assemblies, then each hinge assembly may be expected to handle approximately 0.05 N-m (5.1 kgf-mm). In the example of FIG. 15, two hinge assemblies rated at approximate 20 kgf-mm may be able to handle a housing with a mass of approximately 0.4 kg (e.g., approximately 0.9 lb).

As an example, a system may be configured as a clamshell computer that has dimensions of approximately 320 mm×217 mm×15 mm, with a 14 inch display, measured diagonally. In such an example, a keyboard housing can be thicker and heavier than a display housing. For example, a display housing thickness may be less than 50 percent of a keyboard housing thickness and a display housing mass may be less than 50 percent of a keyboard housing mass. In such an example, where a total thickness is 15 mm, the display housing thickness may be less than approximately 5 mm and, for example, where a total mass is approximately 1.1 kg, the display housing mass may be less than approximately 0.37 kg (e.g., approximately 0.82 lb).

As an example, one or more hinge assemblies can include permanent magnets that may be rated at a maximum torque that is greater than a gravity related torque whereby one or more friction elements may hinder movement of a housing with respect to another housing. As an example, one or more hinge assemblies can include permanent magnets that may be rated at a maximum torque that is less than a gravity related torque whereby one or more friction elements may hinder movement of a housing with respect to another housing.

As an example, one or more friction elements may be utilized to address a mismatch between a magnetic torque and a gravity related torque. In such an example, the one or more friction elements may hinder undesirable movement of a housing with respect to another housing. For example, consider undesirable movement of a housing moving toward an angle of a stable steady state of a hinge assembly or undesirable movement of a housing moving toward a low potential energy level state under the influence of gravity.

As an example, the magnetic field and torque in radially magnetized, permanent magnet couplings can be developed from the magnetic scalar potential in the air gap between a shaft and a cylinder. As mentioned, a type of torque can be a cogging torque, which can exist in some types of stepper motor that include multi-pole couplings.

As an example, magnetic couplings can transmit torque without direct mechanical contact. As an example, a radial magnetic coupling can include a shaft, fitted with a circular array of permanent magnet arc segments, which is separated by an air gap from a similar array of permanent magnet arc segments attached to a bore of a cylinder. In such an example, the magnetization of each arc segment may be assumed to be in a purely radial direction, either positive or negative, with the number and arrangement determining the number of poles in the coupling.

In the case of axial magnetic couplings, closed-form expressions for the force and torque have been derived from the magnetic vector potential obtained by solving Laplace's and Poisson's equation for a two-dimensional (2D) analytical model. As set forth herein, magnetic field and torque in radially magnetized couplings can be derived from a two-dimensional analytical model. Exact closed-form expressions can be obtained by solving Poisson's equation for the magnetic scalar potential in the permanent magnet regions and Laplace's equation in the air gap region.

Figure 16:
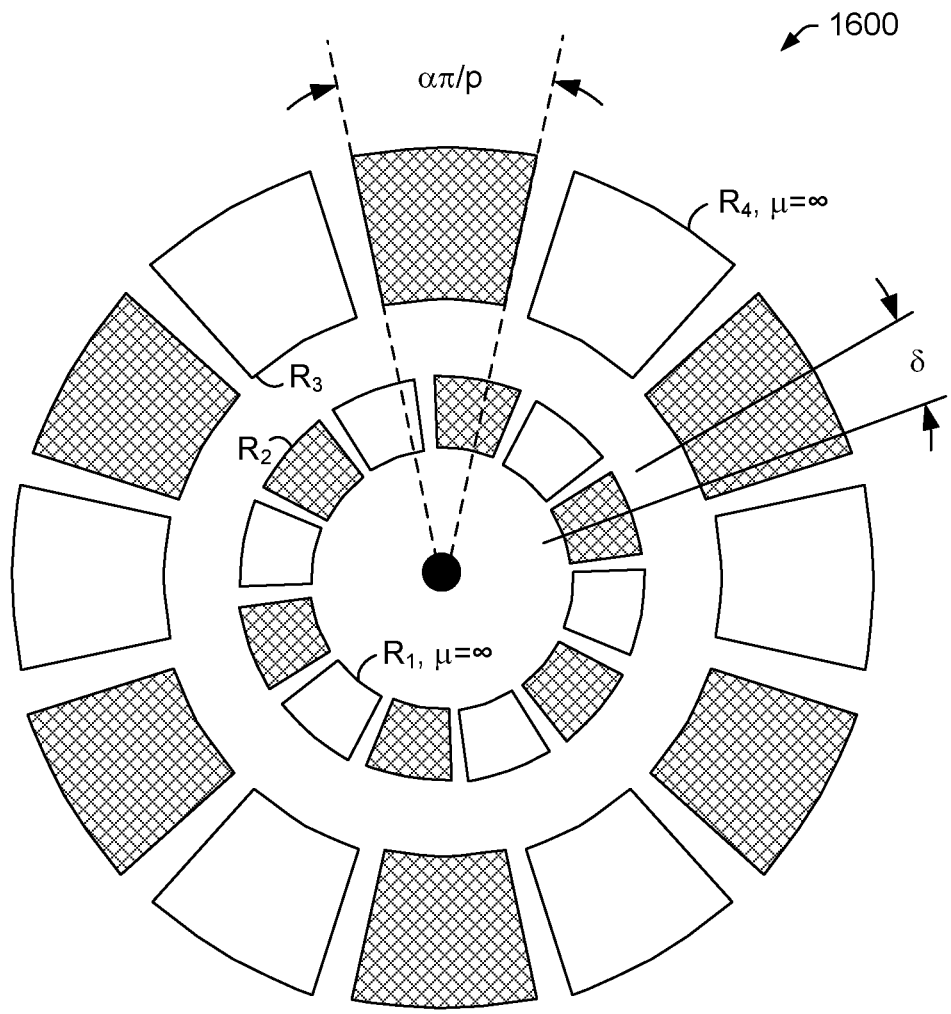
FIG. 16 is a diagram of an example of a multi-pole assembly.

FIG. 16 shows an example of a cross-section of an ideal, radially magnetized coupling 1600. As shown, a circular array of permanent magnet arc segments extends radially to radius $R_2$, from a shaft of radius $R_1$. An air gap separates a corresponding array of permanent magnet arc segments attached to the bore of a cylinder with bore radius $R_4$. The air gap radial clearance is $R_3-R_2$. The pole arc to pole pitch ratio is denoted by α, where the number of poles is p (p=6). The shaft and housing have infinite permeability (μ=∞, at $r=R_1$ and $R_4$). In FIG. 16, δ is an angular offset (torque angle) used as a parameter in the torque expression.

The alternating hatched and non-hatched segments denote alternating positive and negative radial directions of magnetization in each of the adjacent arc segments. With integer p denoting the number of pole pairs, as mentioned, the example of FIG. 16 shows a p=6 pole-pair, radial, magnetic coupling. The cylinder is assumed to be sufficiently long and losses due to end effects and fringing negligible.

As to a two-dimensional analysis, the following assumptions are made: an iron shaft and cylinder have infinite magnetic permeability (μ=∞); and the radially magnetized permanent magnets have relative recoil permeability ($μ_r$=1; reasonable for the neodymium-iron-boron (NdFeB) magnets which have $μ_r$~1.05).

An analysis domain can be separated into three regions: region 1 is the region occupied by permanent magnets attached to the shaft, $R_2 \leq r \leq R_1$; region 2 is the air gap region, $R_3 \leq r \leq R_2$, and region 3 is occupied by the outer constellation of permanent magnets, $R_4 \leq r \leq R_3$. The magnets of region 3 are shown rotated by angle δ (torque angle) relative to the magnets in region 1. From the geometry, the magnetic field distribution is periodic with period T=2π/p.

The constitutive law relating the magnetic flux density vector, B, to the magnetic field intensity vector, H, and the magnetization vector, M, in the permanent magnet regions is:

$$B = \mu(H+M) \quad (1)$$

where $\mu = 4\pi \times 10^{-7}$ henrys/meter, is the permeability of space.

Figure 17:
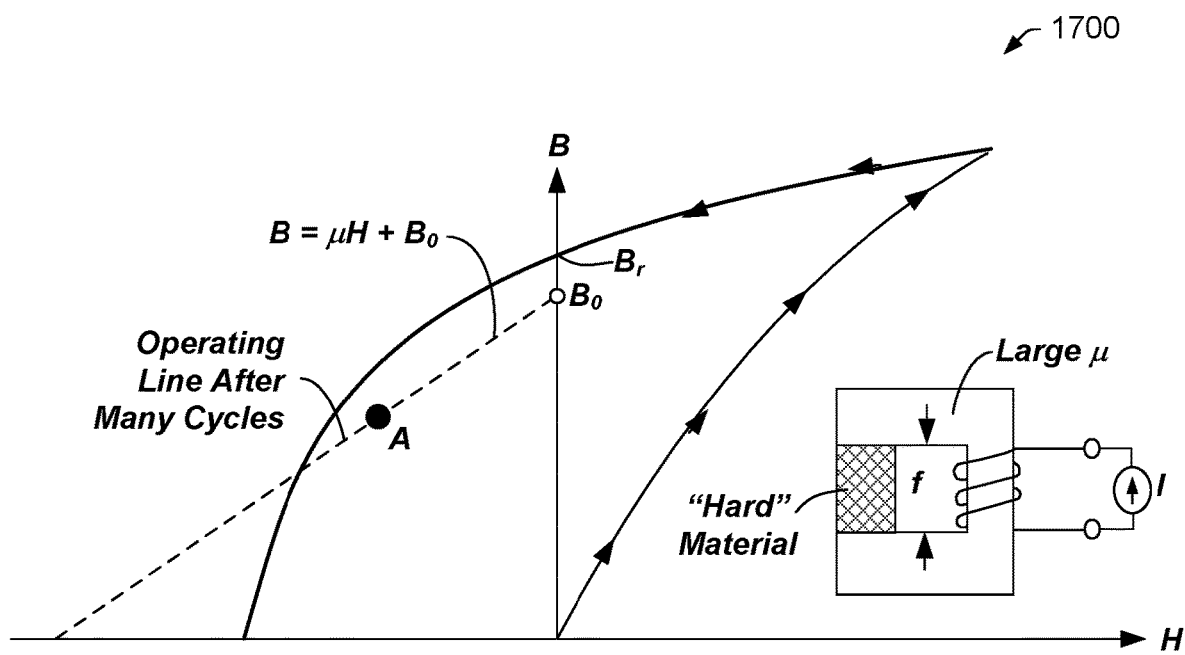
FIG. 17 is a diagram of an example plot.

FIG. 17 shows an example diagram 1700 of a material model with hard magnetic material magnetized and then demagnetized by a current I. In FIG. 17, "hard" magnetic materials can be those with linear demagnetizing curves. The curve results from these materials being subjected to a field intensity H by means of an extremely large current as indicated by the inset. As indicated, when the current (i.e., H) is removed, there is a residual flux density $B_r$. Then, if the sample is removed from the circuit and subjected to other magnetic fields, the B-H curve settles down to operate at some point, such as point A. The straight line indicated by the dotted line is the representative model of the behavior.

A magnetic field problem may be formulated in terms of the scalar magnetic potential. The field intensity can be defined as the negative gradient of a magnetic scalar potential, $\psi$ $$H = -\nabla\psi \quad (2)$$

Gauss's law of magnetism states that the magnetic field has divergence equal to zero, $$\nabla \cdot B = 0 \quad (3)$$

Substituting (2) into (1) and then imposing condition (3) results in the governing equations in each region. Thus, in the permanent magnet regions, 1 and 3, the governing equation can be Poisson's equation, which, expressed in the two cylindrical coordinates (r, θ), is $$\nabla \cdot \nabla \psi(r, \theta) = \frac{\partial^2 \psi}{\partial r^2} + \frac{1}{r}\frac{\partial \psi}{\partial r} + \frac{\partial^2 \psi}{\partial \theta^2} \quad (4)$$
$$= \nabla \cdot M$$

In the air gap region, region 2, M=0, and there is no current source, so the governing equation is Laplace's equation, $$\frac{\partial^2 \psi}{\partial r^2} + \frac{1}{r}\frac{\partial \psi}{\partial r} + \frac{\partial^2 \psi}{\partial \theta^2} = 0 \quad (5)$$

The magnetization vector to be considered has only a radial component, $(M = Mr \, e_r)$, where $e_r$ is a unit vector in the radial direction, distributed ideally.

Figure 18:
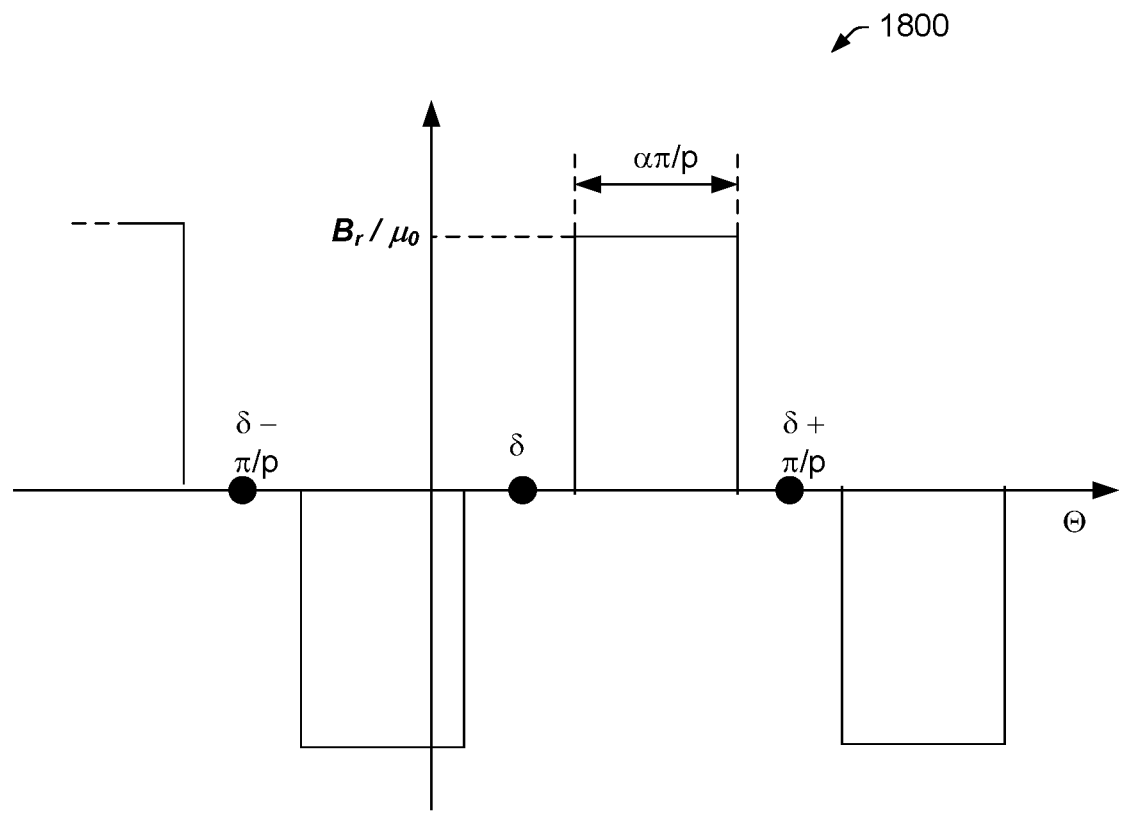
FIG. 18 is a diagram of an example plot.

FIG. 18 shows an example plot 1800 for the radial component of the magnetization vector in region 3. Given such a square wave, it may be represented as a Fourier series and substituted into the right side of Eq. (4); the result is $$\frac{\partial^2 \psi}{\partial r^2} + \frac{1}{r}\frac{\partial \psi}{\partial r} + \frac{\partial^2 \psi}{\partial \theta^2} = \frac{1}{r} M_r \quad (6)$$

$$M_r = \sum_{k=1,3,5,\ldots}^{\infty} M_k * \sin kp(\theta - \delta) \quad (7)$$

where $$M_k = \frac{4}{k\pi} \frac{B_r}{\mu} * \cos k\frac{\pi}{2}(1-\alpha) \quad (8)$$

$M_r$ is composed of an infinite sum of sine waves of odd harmonics. The governing equation in region 1 is similar and is obtained by setting δ equal to zero. To complete the analytical model, certain boundary conditions can be specified and satisfied. For example, the tangential component of H can be zero at soft iron boundaries (since $\mu=\infty$), and the tangential component of H and the normal component of B can be continuous at the interfaces.

FIG. 19 shows an example table 1900 where superscripts and subscripts are utilized to identify the regions or domains and components and associated boundary conditions. As shown, columns for domains 1 and 2, a relation, an interface and an equation are shown in the table 1900.

A general solution for the potential can be obtained by superposition. For example, the analytic model can be split into two parts which, when solved and summed together, provide the solution. The geometry of the first excludes the magnets of region 1, and the second excludes the magnets of region 3.

Figure 20A:
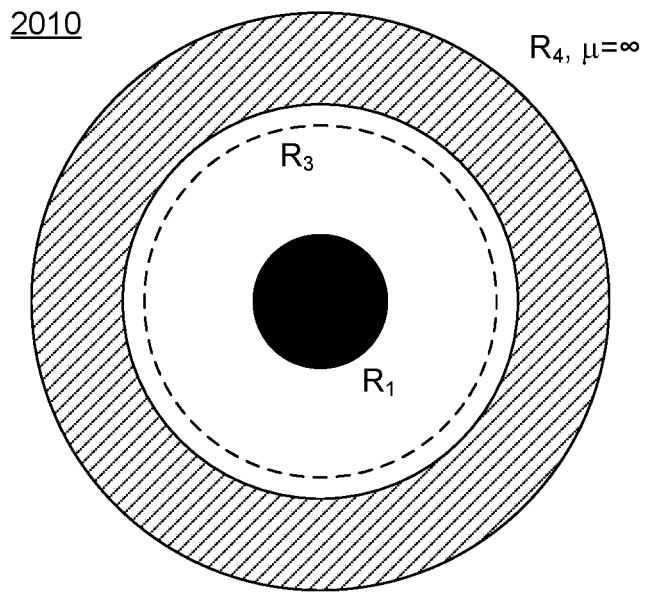
FIG. 20A and FIG. 20B are a series of diagrams of two cases.
Figure 20B:
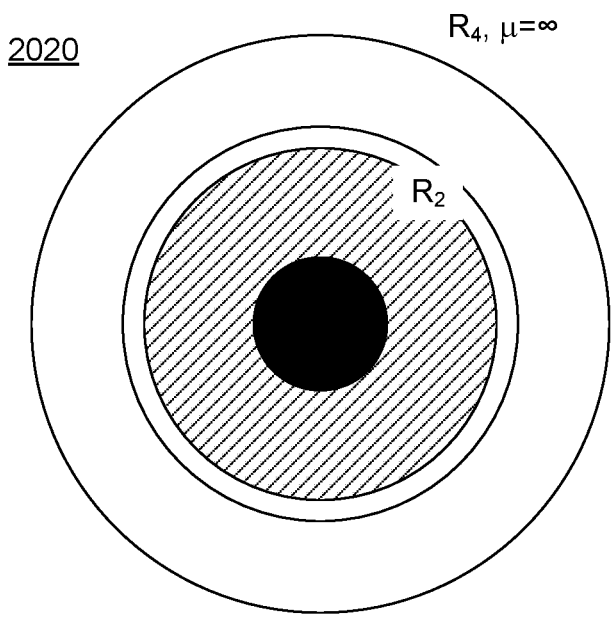

FIG. 20A and FIG. 20B show two cases 2010 and 2020 as associated with splitting of the analytic model into two parts. Specifically, the case 2010 pertains to the model geometry without the inner magnets of region 1, and case 2020 pertains to the model geometry without the outer magnets of region 3. As shown, the iron shaft has radius $r=R_1$, and the outer boundary is at r=R4 for both cases. In each case of the two cases 2010 and 2020, a preliminary solution can be first obtained by considering a single term in the driving function. The complete solution can then be obtained by summation of additional terms as indicated by Eq. (7) and Eq. (8).

A solution for the case 2010 and kp≠1, considering a single term in the driving function, the governing equation in the permanent magnet outer ring is Poisson's equation, $$\frac{\partial^2 \psi}{\partial r^2} + \frac{1}{r}\frac{\partial \psi}{\partial r} + \frac{\partial^2 \psi}{\partial \theta^2} = \frac{1}{r} M_k \sin kp(\theta - \delta) \quad (15)$$

The solution is as follows:

$$\psi^3(r, \theta) = \left[a\left(\frac{r}{R_4}\right)^{kp} + b\left(\frac{R_3}{r}\right)^{kp} + \frac{M_k * r}{1-(kp)^2}\right] \sin kp(\theta - \delta) \quad (16)$$

where a superscript on the scalar potential is used to denote the region, a and b are two arbitrary constants in the complementary solution, and the last term is the particular solution. This particular solution is valid for kp≠1. The solution for kp=1 is given below as a special case.

In the air region, $(R_3 \le r \le R_1)$, the governing equation is Laplace's equation, Eq. (5), with a given solution. A solution can also be chosen to satisfy the boundary conditions, which for the case 2010 can be given by Eqs. (9-11), and Eq. (14), in the table 1900, adjusting the superscripts for the interface boundaries. Accordingly, the solution is of the form:

$$\psi^{(a)}(r,\theta) = \left[A\left(\frac{r}{R_1}\right)^{kp} + B\left(\frac{R_3}{r}\right)^{kp}\right][C\sin(kp*\theta) + D\cos(kp*\theta)] \quad (17)$$

where a superscript (a) is used in this case to represent the scalar potential in the air region for case (a), and A, B, C, and D, are arbitrary constants. The constants in Eq. (16) and Eq. (17) can be determined by applying the boundary conditions (see, e.g., application of boundary conditions further below). The result for the scalar potential in the permanent magnet region is:

$$\psi^3(r,\theta) = J(r)*\sin kp(\theta - \delta) \quad (18)$$
where $$J(r) = \quad (19)$$
$$b\left[\left(\frac{R_3}{r}\right)^{kp} - \left(\frac{R_3}{R_4}\right)^{kp}\left(\frac{r}{R_4}\right)^{kp}\right] - R_4\left(\frac{r}{R_4}\right)^{kp} * \frac{M_k}{1-(kp)^2} + \frac{M_k*r}{1-(kp)^2}$$

and $$b = \frac{M_k*R_3}{2\,[1-(kp)^2]\left[\left(\frac{R_3}{R_1}\right)^{2kp} - \left(\frac{R_3}{R_4}\right)^{2kp}\right]} * \quad (20)$$
$$\left[2\left(\frac{R_3}{R_4}\right)^{kp-1} - \left(1+\left(\frac{R_3}{R_1}\right)^{2kp}\right) - \left(1-\left(\frac{R_3}{R_1}\right)^{2kp}\right)(kp)\right]$$

The result for the scalar potential in the air gap is:

$$\psi^{(a)}(r,\theta) = \frac{J(r=R_3)}{\left(1-\left(\frac{R_3}{R_1}\right)^{2kp}\right)}\left[\left(\frac{R_3}{r}\right)^{kp} - \left(\frac{R_3}{R_1}\right)^{kp}\left(\frac{r}{R_1}\right)^{kp}\right]\sin kp(\theta-\delta) \quad (21)$$

The two components of the magnetic flux density vector in the air region can be computed from Eq. (21). The radial component is:

$$B_r^{(a)} = -\mu\frac{\partial\psi^{(a)}}{\partial r} \quad (22)$$
$$= \mu\frac{J(r=R_3)*(kp)}{\left(1-\left(\frac{R_3}{R_1}\right)^{2kp}\right)*R_3}\left[\left(\frac{R_3}{r}\right)^{kp+1} + \left(\frac{R_3}{R_1}\right)^{kp+1}\left(\frac{r}{R_1}\right)^{kp-1}\right]\sin kp(\theta-\delta)$$

and the tangential component is:

$$B_\theta^{(a)}(r,\theta) = -\mu\frac{\partial\psi^{(a)}}{r\,\partial\theta} \quad (23)$$
$$= -\mu\frac{J(r=R_3)*(kp)}{\left(1-\left(\frac{R_3}{R_1}\right)^{2kp}\right)*r}\left[\left(\frac{R_3}{r}\right)^{kp} - \left(\frac{R_3}{R_1}\right)^{kp}\left(\frac{r}{R_1}\right)^{kp}\right]\cos kp(\theta-\delta)$$

As to the case 2020 and $kp \neq 1$, it is possible to set $\delta = 0$ in Eq. (15) to obtain the governing equation in the permanent magnet inner ring of region 1:

$$\frac{\partial^2\psi}{\partial r^2} = \frac{1}{r}\frac{\partial\psi}{\partial r} + \frac{\partial^2\psi}{\partial\theta^2} = \frac{1}{r}M_k\sin(kp\theta) \quad (24)$$

The solution is:

$$\psi^1(r,\theta) = \left[a\left(\frac{r}{R_1}\right)^{kp} + b\left(\frac{R_2}{r}\right)^{kp} + \frac{M_k*r}{1-(kp)^2}\right]\sin(kp\theta) \quad (25)$$

where a and b are two arbitrary constants (different from the case 2010). In the air region, ($R_2 \leq r \leq R_4$), the solution to Laplace's equation must be chosen to satisfy the boundary conditions, which for the case 2020 is given by Eqs. (12-14), and Eq. (9) in the table 1900. The solution is:

$$\psi^{(b)}(r,\theta) = \left[A\left(\frac{r}{R_4}\right)^{kp} + B\left(\frac{R_2}{r}\right)^{kp}\right][C\sin(kp*\theta) + D\cos(kp*\theta)] \quad (26)$$

where the superscript (b) is used to represent the scalar potential in the air region for the case 2020, and A, B, C, and D, are arbitrary constants.

The constants in Eq. (25) and Eq. (26) can be determined by applying the boundary conditions as mentioned. Some similarities in the boundary conditions and equations can be noted in comparison to the case 2010. For example, consider replacing $R_4$ and $R_3$ in the magnet region for the case 2010 with $R_1$ and $R_2$, to obtain the corresponding solution for the case 2020. Also, by replacing $R_3$ and $R_1$ in the air region for the case 2010 with $R_2$ and $R_4$, respectively, it is possible to obtain the corresponding solution for the case 2020.

The solution for the scalar potential in the permanent magnet region can be written as follows:

$$\psi^1(r,\theta) = L(r)*\sin(kp\theta) \quad (27)$$
where $$L(r) = \quad (28)$$
$$b\left[\left(\frac{R_2}{r}\right)^{kp} - \left(\frac{R_2}{R_1}\right)^{kp}\left(\frac{r}{R_1}\right)^{kp}\right] - R_1\left(\frac{r}{R_1}\right)^{kp} * \frac{M_k}{1-(kp)^2} + \frac{M_k*r}{1-(kp)^2}$$

and $$b = \frac{M_k*R_2}{2\,[1-(kp)^2]\left[\left(\frac{R_2}{R_4}\right)^{2kp} - \left(\frac{R_2}{R_1}\right)^{2kp}\right]} * \quad (29)$$
$$\left[2\left(\frac{R_2}{R_1}\right)^{kp-1} - \left(1+\left(\frac{R_2}{R_4}\right)^{2kp}\right) - \left(1-\left(\frac{R_2}{R_4}\right)^{2kp}\right)(kp)\right]$$

The scalar potential in the air gap is:

$$\psi^{(b)}(r,\theta) = \frac{L(r=R_2)}{\left(1-\left(\frac{R_2}{R_4}\right)^{2kp}\right)}\left[\left(\frac{R_2}{r}\right)^{kp} - \left(\frac{R_2}{R_4}\right)^{kp}\left(\frac{r}{R_4}\right)^{kp}\right]\sin(kp\theta) \quad (30)$$

For the magnetic flux vector in air, the radial component can be written as:

$$B_r^{(b)}(r,\theta) = -\mu\frac{\partial\psi^{(b)}}{\partial r} \quad (31)$$

-continued $$= \mu \frac{L(r=R_2)*(kp)}{\left(1-\left(\frac{R_2}{R_4}\right)^{2kp}\right)*R_2} \left[\left(\frac{R_2}{r}\right)^{kp+1} + \left(\frac{R_2}{R_4}\right)^{kp+1}\left(\frac{r}{R_4}\right)^{kp-1}\right]\sin(kp\theta)$$

and for the tangential component:

$$B_\theta^{(b)}(r,\theta) = -\mu\frac{\partial \psi^{(b)}}{r\,\partial\theta} \tag{32}$$

$$= -\mu\frac{L(r=R_2)*(kp)}{\left(1-\left(\frac{R_2}{R_4}\right)^{2kp}\right)*r}\left[\left(\frac{R_2}{r}\right)^{kp} - \left(\frac{R_2}{R_4}\right)^{kp}\left(\frac{r}{R_4}\right)^{kp}\right]\cos(kp\theta)$$

As to the scalar potential and torque for kW, the solution for the field quantities can be obtained by superposition. For example, the magnetic scalar potential in the air gap region of the coupling is:

$$\psi(r,\theta) = \sum_{k=1,3,5\ldots}^{\infty}(\psi^{(a)}+\psi^{(b)}) \tag{33}$$

where Eqs. (21) and (30) can be substituted in the above, and as many harmonic terms of the forcing function can be included as desired, in accordance with Eqs. (7) and (8).

Of special interest is the torque in the coupling; this can be computed from the Maxwell stress tensor, which, in electromagnetism with only a magnetic field, takes the form:

$$\sigma_{ij} = \frac{1}{\mu}B_i B_j - \frac{1}{2\mu}B^2\delta_{ij} \tag{34}$$

where $B_i$, $B_j$ are components of the flux density vector, and $\delta_{ij}$ is the Kronecker delta.

The magnetic torque can be obtained by considering a circular integration path of any radius, R, within the air gap around the shaft and the tangential component of stress $\sigma_{r\theta}$ from Eq. (34). The differential torque, dT, acting on an element of area Rdθdz is dT=R*$\theta_{r\theta}$*(Rdθdz). Thus, the total magnetic torque per unit length acting on the cylindrical coupling is:

$$T/L = \frac{R^2}{\mu}\int_{-\pi}^{\pi} B_r(R,\theta)*B_\theta(R,\theta)d\theta \tag{35}$$

where L is the axial length of the magnet segments. By adding all the contributions to the field in the same manner as performed for the scalar potential, it is possible to express the torque per unit length as:

$$T/L = \frac{R^2}{\mu}\sum_k^{\infty}\int_{-\pi}^{\pi}[B_r^{(a)}(R,\theta)+B_r^{(b)}(R,\theta)]*[B_\theta^{(a)}(R,\theta)+B_\theta^{(b)}(R,\theta)]d\theta \tag{36}$$

By expansion:

$$T/L = \frac{R^2}{\mu}\sum_k^{\infty}\int_{-\pi}^{\pi}[B_r^{(a)}B_\theta^{(a)} + B_r^{(a)}B_\theta^{(b)} + B_r^{(b)}B_\theta^{(a)} + B_r^{(b)}B_\theta^{(b)}]d\theta \tag{37}$$

An expression for the torque can be obtained by first substituting for each term using Eqs. (22), (23), (31), and (32), and carrying out the integration. The result is the first and fourth integral is zero and only the two middle terms contribute to the torque; therefore, it is the interaction of the two fields that give rise to the torque. The final resulting expression for the torque in the coupling can be written compactly as:

$$T/L = \frac{\pi R^2}{\mu}\sum_k^{\infty}\left(B_{r0}^{(b)}*B_{\theta 0}^{(a)} - B_{r0}^{(a)}*B_{\theta 0}^{(b)}\right)\sin\delta \tag{38}$$

where the extra subscript 0 indicates the amplitude of each respective sinusoid term, which have been evaluated as, namely, $$B_{r0}^{(a)} = \mu\frac{J(r=R_3)*(kp)}{\left(1-\left(\frac{R_3}{R_1}\right)^{2kp}\right)*R_3}\left[\left(\frac{R_3}{R}\right)^{kp+1} + \left(\frac{R_3}{R_1}\right)^{kp+1}\left(\frac{R}{R_1}\right)^{kp-1}\right] \tag{39}$$

$$B_{\theta 0}^{(a)} = -\mu\frac{J(r=R_3)*(kp)}{\left(1-\left(\frac{R_3}{R_1}\right)^{2kp}\right)*R}\left[\left(\frac{R_3}{R}\right)^{kp} - \left(\frac{R_3}{R_1}\right)^{kp}\left(\frac{R}{R_1}\right)^{kp}\right] \tag{40}$$

$$B_{r0}^{(b)} = \mu\frac{L(r=R_2)*(kp)}{\left(1-\left(\frac{R_2}{R_4}\right)^{2kp}\right)*R_2}\left[\left(\frac{R_2}{R}\right)^{kp+1} + \left(\frac{R_2}{R_4}\right)^{kp+1}\left(\frac{R}{R_4}\right)^{kp-1}\right] \tag{41}$$

$$B_{\theta 0}^{(b)} = -\mu\frac{L(r=R_2)*(kp)}{\left(1-\left(\frac{R_2}{R_4}\right)^{2kp}\right)*R}\left[\left(\frac{R_2}{R}\right)^{kp} - \left(\frac{R_2}{R_4}\right)^{kp}\left(\frac{R}{R_4}\right)^{kp}\right] \tag{42}$$

As to a special case of kp=1, the results obtained in the preceding sections can be modified when kp=1. Poisson's equation for the case 2010 becomes:

$$\frac{\partial^2 \psi}{\partial r^2} + \frac{1}{r}\frac{\partial \psi}{\partial r} + \frac{\partial^2 \psi}{\partial \theta^2} = \frac{1}{r}M_k\sin(\theta-\delta) \tag{43}$$

And, the solution is:

$$\psi^3(r,\theta) = \left[a\left(\frac{r}{R_4}\right) + b\left(\frac{R_3}{r}\right) + \frac{M_k*\ln r*r}{2}\right]\sin(\theta-\delta) \tag{44}$$

Thus, the new solution can be obtained from the previous by setting kp=1, and replacing the term $M_k/(1-(kp)^2)$ in the particular solution with $(M_k/2)*\ln r$.

Similarly, in the air region the solution to Laplace's equation can now be written as:

$$\psi^{(a)}(r,\theta) = \left[A\left(\frac{r}{R_1}\right) + B\left(\frac{R_3}{r}\right)\right][C\sin\theta + D\cos\theta] \quad (45)$$

The constants can be determined by applying the boundary conditions as before. The result for the scalar potential in the permanent magnet region is:

$$\psi^3(r,\theta) = J(r)*\sin(\theta - \delta) \quad (46)$$

where $$J(r) = b\left[\left(\frac{R_3}{r}\right) - \left(\frac{R_3}{R_4}\right)\left(\frac{r}{R_4}\right)\right] - R_4\left(\frac{r}{R_4}\right)*\frac{M_k}{2}*\ln R_4 + \frac{M_k*r}{2}\ln r \quad (47)$$

and $$b = \frac{M_k * R_3}{4*\left[\left(\frac{R_3}{R_1}\right)^2 - \left(\frac{R_3}{R_4}\right)^2\right]} * \left[\left(1 - \left(\frac{R_3}{R_1}\right)^2 - 2*\ln\left(\frac{R_3}{R_4}\right)\right)\right] \quad (48)$$

The result for the scalar potential in the air gap is:

$$\psi^{(a)}(r,\theta) = \frac{J(r=R_3)}{\left(1 - \left(\frac{R_3}{R_1}\right)^2\right)}\left[\left(\frac{R_3}{r}\right) - \left(\frac{R_3}{R_1}\right)\left(\frac{r}{R_1}\right)\right]\sin(\theta - \delta) \quad (49)$$

The two components of the magnetic flux density vector in the air region can be computed from Eq. (49), where the radial component is:

$$B_r^{(a)}(r,\theta) = -\mu\frac{\partial\psi^{(a)}}{\partial r} \quad (50)$$
$$= \mu\frac{J(r=R_3)}{\left(1-\left(\frac{R_3}{R_1}\right)^2\right)*R_3}\left[\left(\frac{R_3}{r}\right)^2 + \left(\frac{R_3}{R_1}\right)^2\right]\sin(\theta - \delta)$$

And, the tangential component is:

$$B_\theta^{(a)}(r,\theta) = -\mu\frac{\partial\psi^{(a)}}{r\partial\theta} \quad (51)$$
$$= -\mu\frac{J(r=R_3)}{\left(1-\left(\frac{R_3}{R_1}\right)^2\right)*r}\left[\left(\frac{R_3}{r}\right) - \left(\frac{R_3}{R_1}\right)\left(\frac{r}{R_1}\right)\right]\cos(\theta - \delta)$$

As to a special case of kp=1 for the case 2020, Poisson's equation is:

$$\frac{\partial^2\psi}{\partial r^2} + \frac{1}{r}\frac{\partial\psi}{\partial r} + \frac{\partial^2\psi}{\partial\theta^2} = \frac{1}{r}M_k\sin\theta \quad (52)$$

Obtained by letting $\delta$=0, the solution is:

$$\psi^1(r,\theta) = \left[a\left(\frac{r}{R_1}\right) + b\left(\frac{R_2}{r}\right) + \frac{M_k*\ln r*r}{2}\right]\sin\theta \quad (53)$$

Similarly, in the air region the solution to Laplace's equation can be written as:

$$\psi^{(b)}(r,\theta) = \left[A\left(\frac{r}{R_4}\right) + B\left(\frac{R_2}{r}\right)\right][C\sin\theta + D\cos\theta] \quad (54)$$

The constants can be determined by applying the boundary conditions as before. The result for the scalar potential in the permanent magnet region is:

$$\psi^1(r,\theta) = L(r)*\sin\theta \quad (55)$$

where $$L(r) = b\left[\left(\frac{R_2}{r}\right) - \left(\frac{R_2}{R_1}\right)\left(\frac{r}{R_1}\right)\right] - R_1\left(\frac{r}{R_1}\right)*\frac{M_k}{2}*\ln R_1 + \frac{M_k*r}{2}\ln r \quad (56)$$

and $$b = \frac{M_k * R_2}{4*\left[\left(\frac{R_2}{R_4}\right)^2 - \left(\frac{R_2}{R_1}\right)^2\right]} * \left[\left(1 - \left(\frac{R_2}{R_4}\right)^2 - 2*\ln\left(\frac{R_2}{R_1}\right)\right)\right] \quad (57)$$

The result for the scalar potential in the air gap is:

$$\psi^{(b)}(r,\theta) = \frac{L(r=R_2)}{\left(1 - \left(\frac{R_2}{R_4}\right)^2\right)}\left[\left(\frac{R_2}{r}\right) - \left(\frac{R_2}{R_4}\right)\left(\frac{r}{R_4}\right)\right]\sin\theta \quad (58)$$

The two components of the magnetic flux density vector in the air region can be computed from Eq. (58), where the radial component is:

$$B_r^{(b)}(r,\theta) = -\mu\frac{\partial\psi^{(a)}}{\partial r} = \mu\frac{L(r=R_2)}{\left(1-\left(\frac{R_2}{R_4}\right)^2\right)*R_2}\left[\left(\frac{R_2}{r}\right)^2 + \left(\frac{R_2}{R_4}\right)^2\right]\sin\theta \quad (59)$$

And, the tangential component is:

$$B_\theta^{(a)}(r,\theta) = -\mu\frac{\partial\psi^{(a)}}{r\partial\theta} = -\mu\frac{L(r=R_2)}{\left(1-\left(\frac{R_2}{R_4}\right)^2\right)*r}\left[\left(\frac{R_2}{r}\right) - \left(\frac{R_2}{R_4}\right)\left(\frac{r}{R_4}\right)\right]\cos\theta \quad (60)$$

The derived closed-form expressions can be utilized for one or more purposes. For example, consider computations on a radially magnetized, multi-pole coupling, with parameters given in Table 1 below.

TABLE 1

| Item | Description | Value |
|---|---|---|
| $R_1$ | Inner radius of shaft magnets | $1.5 \times 10^{-3}$ m |
| $R_2$ | Outer radius of shaft magnets | $3.0 \times 10^{-3}$ m |
| $R_3$ | Inner radius of cylinder magnets | $3.25 \times 10^{-3}$ m |
| $R_4$ | Outer radius of cylinder magnets | $5 \times 10^{-3}$ m |
| L | Axial length of magnets | $37 \times 10^{-3}$ m |

TABLE 1-continued

| Item | Description | Value |
|---|---|---|
| $B_r$ | Residual flux density, N52 magnet | 1.44 Tesla |
| α | Pole arc to pole pitch ratio | 0.9 |
| p | Number of pole-pairs | variable |

The torque calculations can be performed by taking a contour in the air gap with radius equal to the mean radius, (e.g., $R=(R_2+R_3)/2$). Table 2 shows the amplitude of the cogging torque per unit length, computed from the torque expressions, for different number of pole-pairs as well as the contribution of the first four terms of k included in the summation.

TABLE 2

| | Number of pole pairs, p | | | | | |
|---|---|---|---|---|---|---|
| Index, k | 1 | 2 | 3 | 4 | 5 | 6 |
| 1 | 15.95 | 24.60 | 27.33 | 27.27 | 26.08 | 24.48 |
| 3 | 1.76 | 2.21 | 1.76 | 1.39 | 1.09 | 0.86 |
| 5 | 0.11 | 0.37 | 0.25 | 0.17 | 0.11 | 0.07 |
| 7 | 0.07 | 0.06 | 0.03 | 0.02 | 0.01 | 0.01 |
| Σ(T/L)= | 17.89 | 27.24 | 29.37 | 28.85 | 27.29 | 25.42 |

The sum converges rapidly and even a single term (k=1) approximation can yield a sufficiently accurate estimate for a preliminary sizing study. Within the range examined for this coupling, the maximum cogging torque that could be achieved is 29.37 N-m per meter of axial length of the magnet segments.

Figure 21:
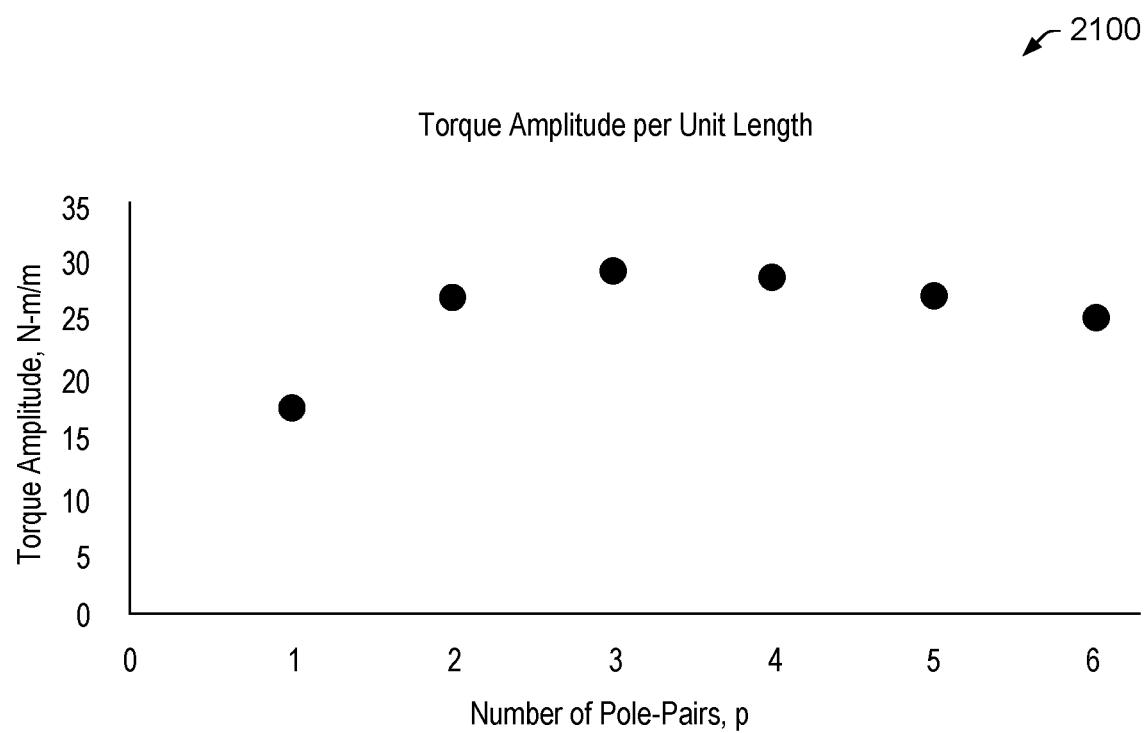
FIG. 21 is a diagram of an example plot.

FIG. 21 shows an example plot 2100 that includes torque versus pole-pair number, p, where a maximum cogging torque corresponds to a 3 pole-pair design.

Torque measurements were taken on several couplings. The magnet segments were constructed from N52 (NdFeB) magnets and samples correspond to the 6 pole-pair geometry of Table 1. Neodymium magnets may be graded according to maximum energy product, which relates to the magnetic flux output per unit volume where higher values indicate stronger magnets. For sintered NdFeB magnets under an international classification scheme, values tend to range from 28 up to 52 (e.g., N28 to N52). In such a scheme, the first letter N before the values is short for neodymium (e.g., sintered NdFeB magnets) and one or more letters that follow the values can indicate intrinsic coercivity and maximum operating temperatures (e.g., positively correlated with the Curie temperature), which may range from default (e.g., up to 80° C. or 176° F.) to AH (e.g., 230° C. or 446° F.). The steel shaft and housing are constructed of SUS403 (e.g., consider chemical composition of C at max. 0.15, Si at max. 0.5, Mn at max. 1.00, P at max. 0.04, S at max. 0.03, Ni at max. 0.6, and Cr at 11.5-13.0). The magnet arc segments are magnetized diametrically (e.g., in a uniform direction) rather than in a truly radial direction. Such an approach can be utilized rather than directly producing a radial magnetization field. As an example, as the number of arc segments increases, the field will better approximate a true radial field.

Figure 22:
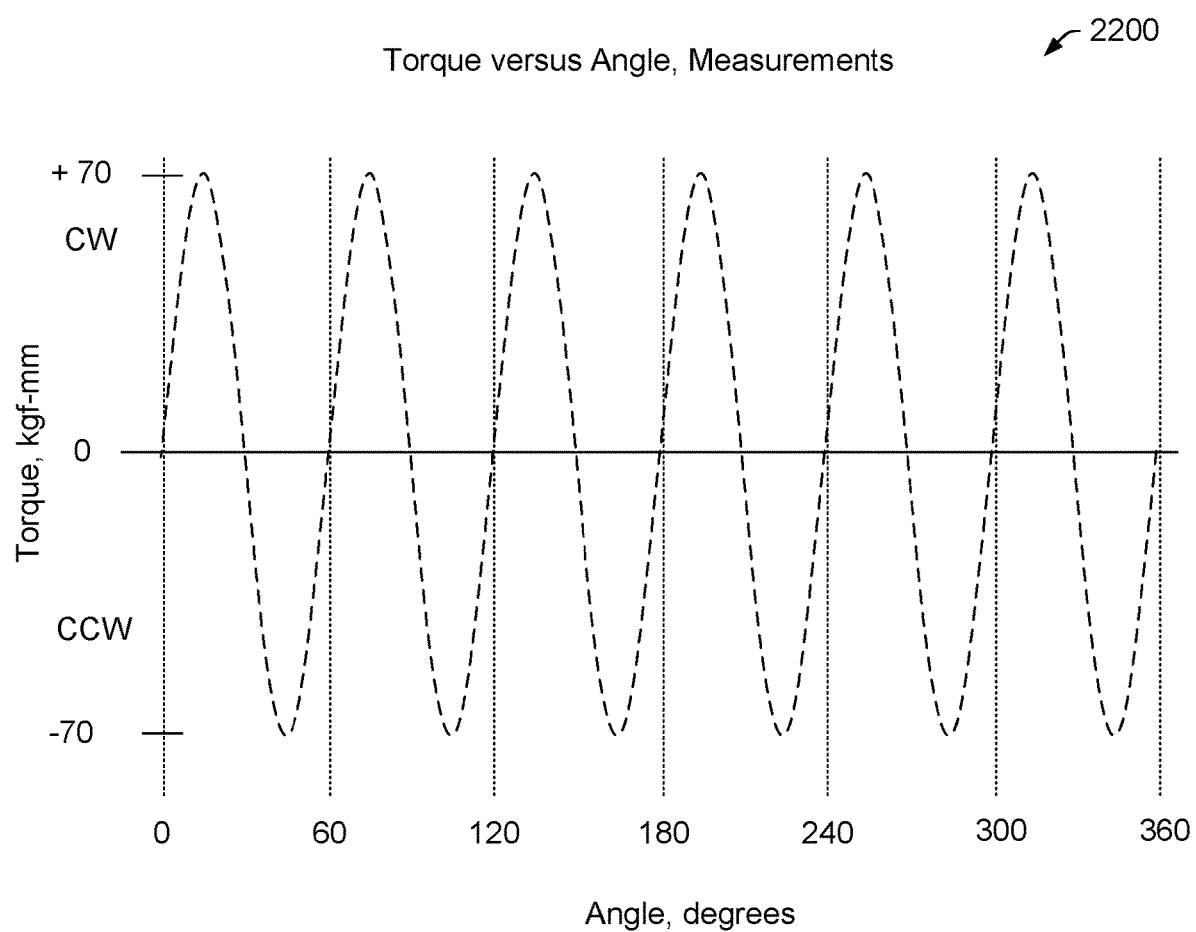
FIG. 22 is a diagram of an example plot.

FIG. 22 shows an example plot 2200 that represents the torque measurements using a single sine function. Measurements were made in both clockwise and counter-clockwise directions and cover one full revolution of the shaft. The average amplitude was approximately 70 kgf-mm. From Table 2, the predicted amplitude of the cogging torque for an ideal, radially magnetized, 6 pole-pair coupling with this geometry would be 95.9 kgf-mm. The prediction may be adjusted and brought into better correlation with the experimental measurements by replacing the value of $B_r$ with a reduced value $B_0$.

The scalar potential for multi-pole, radially magnetized couplings have been derived from the solution of Poisson's equation in the permanent magnet regions, and Laplace's equation in the air-gap region. All field quantities of interest can be obtained from the scalar potentials. In particular, the closed-form expression for the cogging torque is developed, which shows sinusoidal behavior. The theoretical prediction for a 6 pole-pair coupling is compared with measurements taken on several example assemblies, and the utility of the closed-form expression illustrated with a simple parametric study. The model can be correlated to experimental findings in practice.

As mentioned, constants can be determined from the boundary conditions. For example, consider the case 2010 where $kp \ne 1$. In such an example, the boundary condition, $$\left(\frac{\partial \psi 3(R_4, \theta)}{\partial \theta} = 0\right), \qquad \text{Eq. (9)}$$

can be applied together with Eq. (16), then:

$$a = -b \left(\frac{R_3}{R_4}\right)^{kp} - \frac{M_k * R_4}{1 - (kp)^2} \qquad (A1)$$

Eqs. (18) and (19) follow from substituting Eq. (A1) into Eq. (16):

$$\psi^3(r, \theta) = J(r) * \sin kp(\theta - \delta) \qquad (18)$$

$$J(r) = \qquad (19)$$
$$b \left[\left(\frac{R_3}{r}\right)^{kp} - \left(\frac{R_3}{R_4}\right)^{kp} \left(\frac{r}{R_4}\right)^{kp}\right] - R_4 \left(\frac{r}{R_4}\right)^{kp} * \frac{M_k}{1 - (kp)^2} + \frac{M_k * r}{1 - (kp)^2}$$

Apply boundary condition, $$\left(\frac{\partial \psi a(R1, \theta)}{\partial \theta} = 0\right), \qquad \text{Eq. (14)}$$

together with Eq. (17), then:

$$A = -B \left(\frac{R_3}{R_1}\right)^{kp} \qquad (A2)$$

Substitute Eq. (A2) into Eq. (17):

$$\psi^{(a)}(r, \theta) = \left[\left(\frac{R_3}{r}\right)^{kp} - \left(\frac{R_3}{R_1}\right)^{kp} \left(\frac{r}{R_1}\right)^{kp}\right] \qquad (A3)$$
$$[BC \sin(kp * \theta) + BD \cos(kp * \theta)]$$

Apply boundary condition, $$\left(-\frac{1}{r}\frac{\partial \psi 3(R3)}{\partial \theta} = -\frac{1}{r}\frac{\partial \psi a(R3)}{\partial \theta}\right), \quad \text{Eq. (10)}$$

$$J(r = R_3) \cos kp(\theta - \delta) = \quad (A4)$$

$$\left[1 - \left(\frac{R_3}{R_1}\right)^{2kp}\right] [BC \cos(kp*\theta) - BD \sin(kp*\theta)]$$

Equating coefficients of the sine and cosine terms, obtain the two relations:

$$J(r = R_3) \cos kp\delta = \left[1 - \left(\frac{R_3}{R_1}\right)^{2kp}\right] BC \quad (A5)$$

$$J(r = R_3) \sin kp\delta = -\left[1 - \left(\frac{R_3}{R_1}\right)^{2kp}\right] BD \quad (A6)$$

Eliminate δ by squaring both sides of Eqs. (A5) and (A6) and adding to get:

$$[J(r = R_3)]^2 = \left[1 - \left(\frac{R_3}{R_1}\right)^{2kp}\right]^2 [BC^2 + BD^2] \quad (A7)$$

Apply boundary condition, Eq. (11), $$B_r^3 = B_r^a \text{ or } \left(-\frac{\partial \psi 3(R3)}{\partial r} + M_r = -\frac{\partial \psi a(R3)}{\partial r}\right):$$

$$\left(M_k - \frac{\partial J}{\partial r}\bigg|r = R_3\right) \sin kp (\theta - \delta) = \quad (A8)$$

$$\frac{kp}{R_3}\left[1 + \left(\frac{R_3}{R_1}\right)^{2kp}\right] [BC \sin(kp*\theta) + BD \cos(kp*\theta)]$$

Equating coefficients of the sine and cosine terms, obtain the two relations:

$$\left(M_k - \frac{\partial J}{\partial r}\bigg|r = R_3\right) \cos kp\delta = \frac{kp}{R_3}\left[1 + \left(\frac{R_3}{R_1}\right)^{2kp}\right] BC \quad (A9)$$

$$-\left(M_k - \frac{\partial J}{\partial r}\bigg|r = R_3\right) \sin kp\delta = \frac{kp}{R_3}\left[1 + \left(\frac{R_3}{R_1}\right)^{2kp}\right] BD \quad (A10)$$

Squaring both sides and adding:

$$\left(M_k - \frac{\partial J}{\partial r}\bigg|r = R_3\right)^2 = (kp/R_3)^2 \left[1 + \left(\frac{R_3}{R_1}\right)^{2kp}\right]^2 [BC^2 + BD^2] \quad (A11)$$

Eliminate [$BC^2+BD^2$] using Eqs. (A7) and (A11) to arrive at:

$$\frac{J(r = R_3)}{1 - \left(\frac{R_3}{R_1}\right)^{2kp}} = \frac{\left(\frac{R_3}{kp}\right)\left(M_k - \frac{\partial J}{\partial r}\bigg|r = R_3\right)}{1 + \left(\frac{R_3}{R_1}\right)^{2kp}} \quad (A12)$$

By substituting Eq. (19) into Eq. (A12), the equation can be solved to determine the constant b. The result is Eq. (20):

$$b = \frac{M_k * R_3}{2 \; [1 - (kp)^2]\left[\left(\frac{R_3}{R_1}\right)^{2kp} - \left(\frac{R_3}{R_4}\right)^{2kp}\right]} * \quad (20)$$

$$\left[2\left(\frac{R_3}{R_4}\right)^{kp-1} - \left(1 + \left(\frac{R_3}{R_1}\right)^{2kop}\right) - \left(1 - \left(\frac{R_3}{R_1}\right)^{2kp}\right)(kp)\right]$$

With b determined, compute $J(r=R_3)$ from Eq. (19). Then, for every value of δ, compute BC and BD from Eqs. (A5) and (A6). Then one can have ψ, $B_r$ and $B_\theta$. For example, substituting for BC and BD from Eqs. (A5) and A(6) into Eq. (A3), it is possible to arrive at Eq. (21):

$$\psi^{(a)}(r, \theta) = \frac{J(r = R_3)}{\left(1 - \left(\frac{R_3}{R_1}\right)^{2kp}\right)}\left[\left(\frac{R_3}{r}\right)^{kp} - \left(\frac{R_3}{R_1}\right)^{kp}\left(\frac{r}{R_1}\right)^{kp}\right] \sin kp(\theta - \delta) \quad (21)$$

Figure 23:
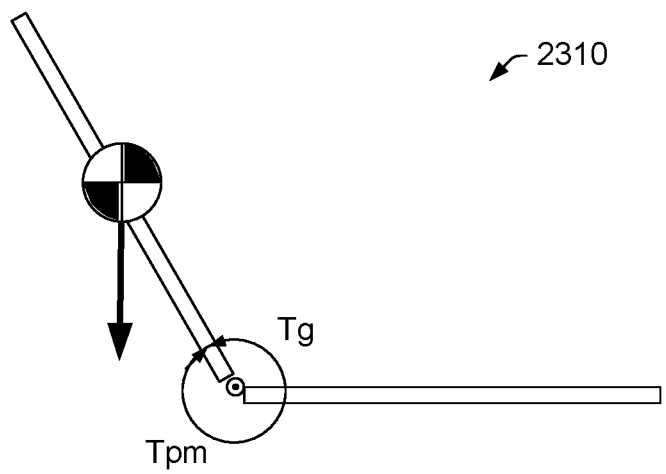
FIG. 23 is a diagram of an example of a method and an example of an information handling system that operates according to the method.

FIG. 23 shows an example of a method 2300 that includes stabilizing a position of a display housing with respect to a keyboard housing of an information handling system that includes a hinge assembly that rotatably couples the display housing and the keyboard housing, where the hinge assembly includes permanent magnets that generate a restoring torque that counteracts a gravity related torque of the display housing about the hinge assembly. In such an example, the position of the display housing with respect to the keyboard housing can be characterized by an angle between the display housing and the keyboard housing that is greater than 90 degrees where, for example, the position is a first position and where the method includes stabilizing a second position of the display housing with respect to the keyboard housing, where the second position is characterized by an angle between the display housing and the keyboard housing that is less than 90 degrees. As an example, a position of the display housing with respect to the keyboard housing may be characterized by an angle between the display housing and the keyboard housing that is less than 90 degrees. In such an example, the position can be a first position and the method can include stabilizing a second position of the display housing with respect to the keyboard housing, where the second position is characterized by an angle between the display housing and the keyboard housing that is greater than 90 degrees. As an example, an angle of 90 degrees can be an angle that aligns the display housing with the direction of acceleration of gravity where, for example, the keyboard housing is substantially horizontal.

FIG. 23 also shows a diagram of an information handling system (IHS) that includes a display housing and a keyboard housing where a gravity related torque (Tg) is counteracted by a permanent magnet torque (Tpm) to stabilize a position of the display housing of the IHS.

Figure 24:
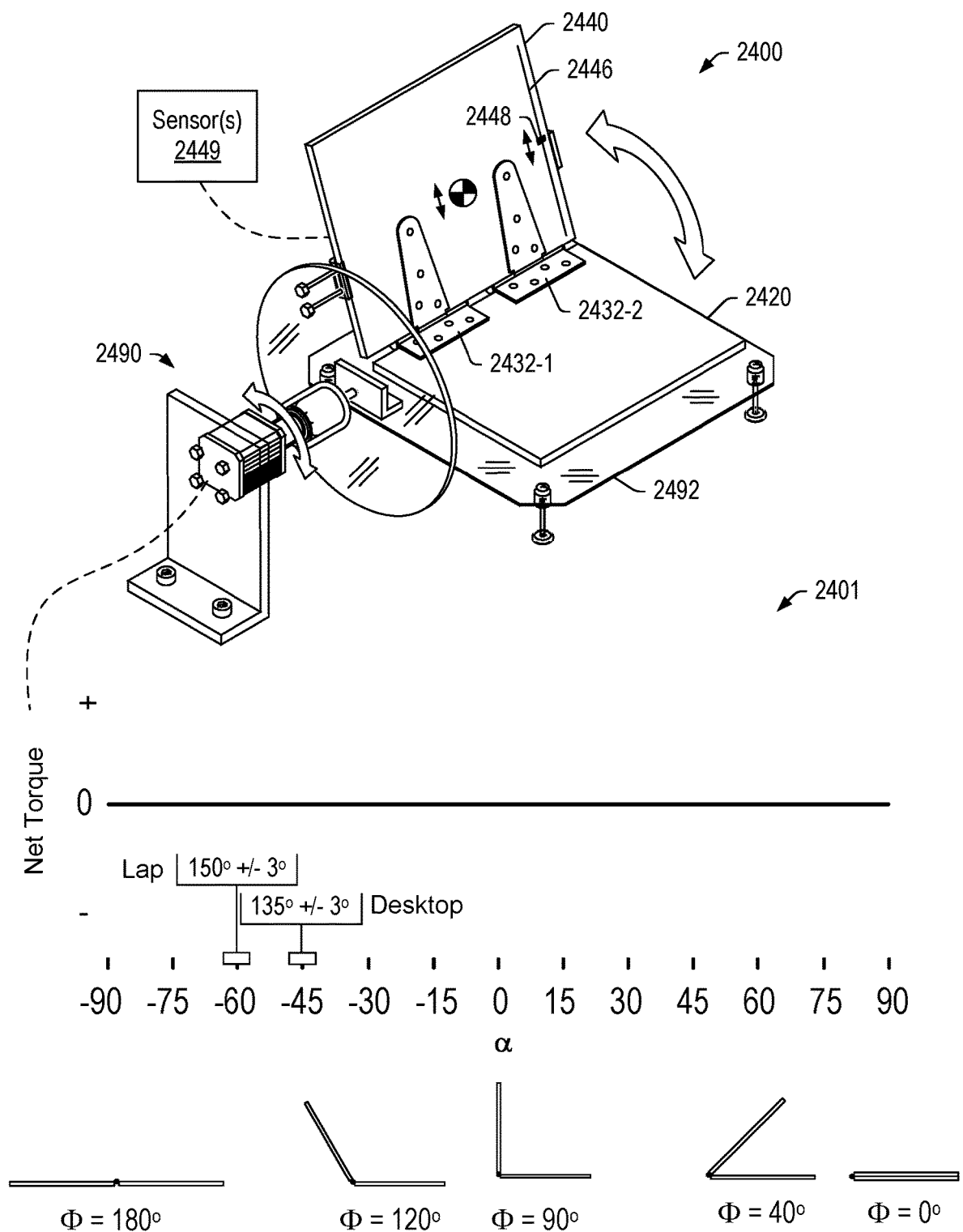
FIG. 24 is a diagram of an example of a system, an example of a measurement system and an example of a plot of net torque versus angle.

FIG. 24 shows an example of a system 2400 that includes a first housing 2420 that can include a processor and memory accessible to the processor; a second housing 2440 that includes a display operatively coupled to a processor (e.g., a processor of the first housing 2420 and/or a processor of the second housing 2440); and a hinge assembly 2432-1 and 2432-2 that rotatably couples the first housing 2420 and the second housing 2440, where the hinge assembly 2432-1 and 2432-2 includes permanent magnets that generate a first magnetic field and a second magnetic field orientable with respect to each other via rotation of the second housing 2440 with respect to the first housing 2420, where the first magnetic field and the second magnetic field include an aligned orientation, generate a clockwise restoring torque responsive to rotation in a first rotational direction from the aligned orientation, and generate a counterclockwise restoring torque responsive to rotation in a second, opposite rotational direction from the aligned orientation.

In the example of FIG. 24, a measurement system 2490 is shown that can measure torque as the second housing 2440 is rotated with respect to the first housing 2420, which may be supported on a table 2492 of the measurement system 2490.

FIG. 24 shows an example plot 2401 of net torque versus angle α and angle Φ where the net torque is approximately 0 over a range of angles −90 degrees≤α≤+90 degrees (0 degrees≤Φ≤180 degrees).

As an example, the system 2400 may be designed to provide a customized net torque response. Such a design can be part of a magnetic hinge assembly (e.g., fixed or adjustable), part of a friction hinge assembly (e.g., fixed or adjustable), part of a center of mass location (e.g., fixed or adjustable), etc. As an example, a center of mass location may be adjustable using a slider assembly that includes a groove 2446 and a movable mass 2448. For example, a user may move the movable mass 2448 in the groove 2446 toward the hinge assembly 2432-1 and 2432-2 to cause a gravity related torque to be less than a magnetic related torque or, for example, a user may move the movable mass 2448 in the groove 2446 away from the hinge assembly 2432-1 and 2432-2 to cause a gravity related torque to be greater than a magnetic related torque (e.g., a restoring torque).

As an example, where a user is utilizing the system 2400 on a horizontal desktop at an angle Φ of approximately 135 degrees, if the user desires transitioning the system 2400 to the orientation with Φ equal to 180 degrees, the movable mass 2448 may be moved away from the hinge assembly 2432-1 and 2432-2 such that the center of mass changes such that a gravity related torque is greater than a magnetic related torque and the second housing 2440 automatically moves. Similarly, if the user desires transitioning the system 2400 to the orientation with Φ equal to 90 degrees, the movable mass 2448 may be moved toward from the hinge assembly 2432-1 and 2432-2 such that the center of mass changes such that a gravity related torque is less than a magnetic related torque and the second housing 2440 automatically moves. In such an example, the user may tip the second housing 2440 to an angle less than 90 degrees while also moving the movable mass 2448 away from the hinge assembly 2432-1 and 2432-2 such that the second housing 2440 automatically moves to the orientation with Φ equal to 0 degrees.

FIG. 24 also shows the system 2400 as including one or more sensors 2449. For example, the system 2400 can include an integral torque sensor such as that of the measurement system 2490 and/or the system 2400 can include one or more position and/or motion sensors. As to an integral torque sensor, it may be utilized to measure torque and cause issuance of a signal (e.g., an instruction, a command, a sound, a graphic, a light, etc.) where the signal may guide a user in making an adjustment to a center of mass such as by moving the movable mass 2448 to a desired position to achieve a desired torque, which may be a net torque of approximately zero. As to a position and/or motion sensor, consider one or more of a gravity sensor, an accelerometer, a gyroscope, a level sensor, a distance sensor, and a rotational position sensor. In such an example, a measurement may indicate a direction of gravity with respect to a system or a portion of a system. As illustrated, the angle formed by the direction of gravity with respect to a display housing depends on a rotational position of the display housing. Where a display housing includes a sensor that can measure the direction of gravity, the angle of the display housing may be determined. As an example, a keyboard housing may include such a sensor where measurements from a display housing sensor and a keyboard housing sensor can be utilized to determine an open angle (e.g., a value of the angle Φ) of the display housing with respect to the keyboard housing. In such an example, a signal may be issued that indicates how an adjustment may be made, for example, to a movable mass that can alter a center of mass of a display housing for achieving a desired balance of torque (e.g., to achieve a net torque of approximately zero).

As an example, a system may provide feedback that can be interpreted by a user such that the user can make one or more adjustments to the system, which may be an adjustment to a display housing, an adjustment to a keyboard housing (e.g., adjusting with respect to gravity, etc.), or an adjustment to the system that adjusts both the display housing and the keyboard housing. For example, consider feedback rendered to a display of the display housing that instructs a user to "level" the keyboard housing to make it substantially horizontal or to dispose it at an angle other than horizontal, which may depend on a position of a center of mass of a display housing. As an example, feedback can include measuring or detecting a position of a center of mass, which may include providing a sensor coupled to a movable mass or acquiring torque measurements for two different positions of a display housing or measuring movement of a display housing due in part to an offset between a gravity torque and a restoring torque, etc. As explained, one or more sensors may be utilized to provide a signal or signals, which may provide for feedback such that a user and/or the system itself may make one or more adjustments to the system, for example, as to torque or torques.

Figure 25:
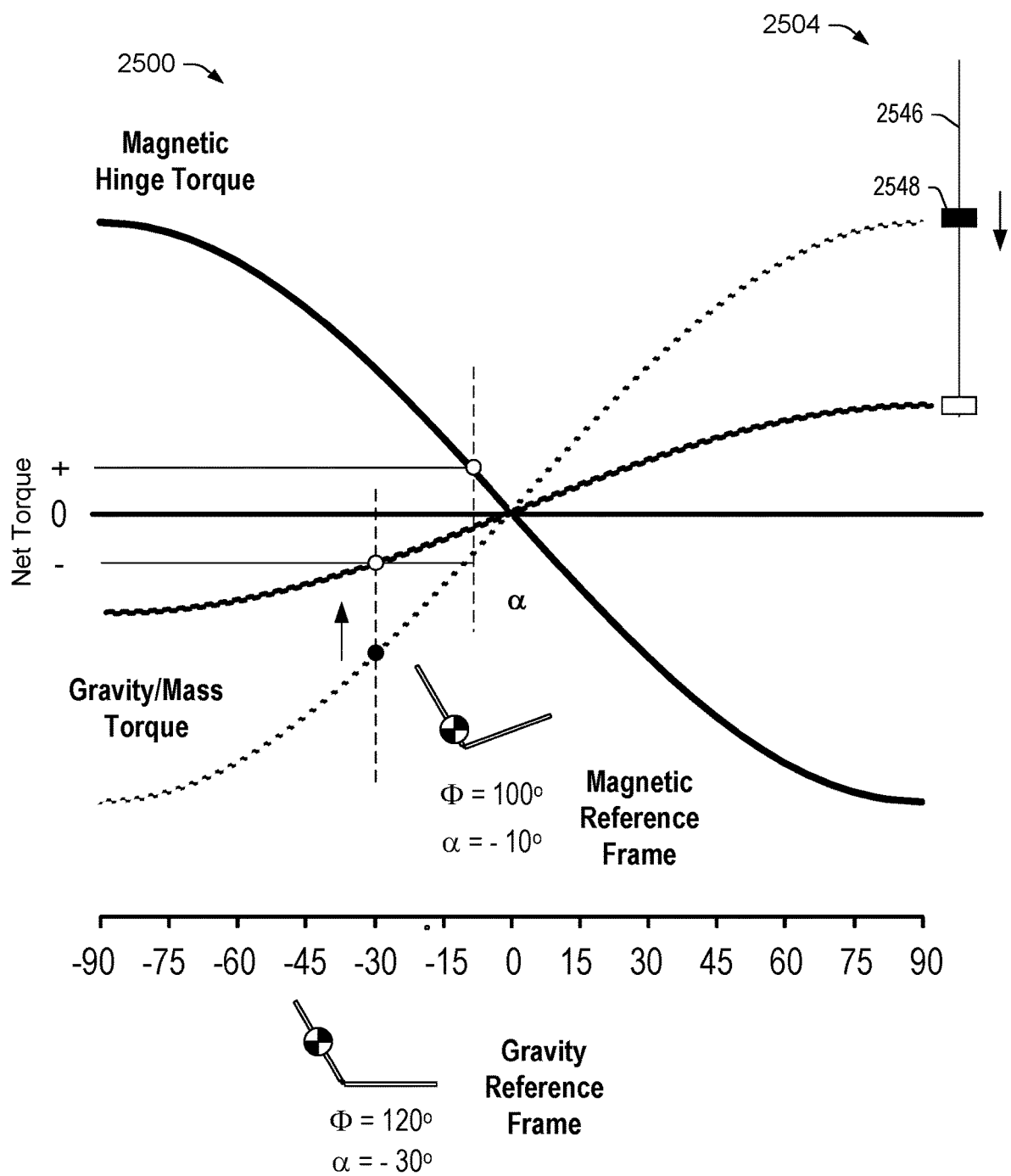
FIG. 25 is a diagram of an example of a plot of net torque versus angle and an example of a center of mass adjustment assembly.

FIG. 25 shows an example plot 2500 with an example of a center of mass adjustment assembly 2504 for a housing that can include a guide 2546 and a movable mass 2548. As an example, the movable mass 2548 can be a fraction of a total mass of a housing that can be adjustably moved away from a hinge assembly or toward a hinge assembly (see, e.g., FIG. 7), for example, to adjust at least a portion of a gravity related torque curve (see, e.g., FIG. 8). The plot 2500 shows a magnetic reference frame and a gravity reference frame for a system where magnets can be aligned at angles shown in the magnetic reference frame while a gravity force (e.g., F=mg) applies to a display housing of the system in the gravity reference frame. The magnetic reference frame may correspond to a user placing the system on her legs at an angle that differs from horizontal. In another example, a user may place the system on a desktop that has an angle that differs from horizontal (e.g., α=+10°). Such displacements can result in a mismatch between magnetic hinge torque (e.g., restoring torque) and gravity torque. In the example of FIG. 25, the movable mass 2548 may be moved (e.g., manually, semi-automatically, or automatically) to effectively shorten the lever arm by moving the center of mass of the display housing toward a hinge assembly of the system. In such an example, there can be a compensation for the 20 degree difference between the reference frames such that a net torque of zero is established. With a net torque of zero, the display housing of the system can be maintained in a stable state as illustrated in the magnetic reference frame. As explained, measurements from one or more sensors may be utilized as part of a method for achieving or maintaining a stable state.

As an example, a system can include a first housing that includes a processor and memory accessible to the processor; a second housing that includes a display operatively coupled to the processor; a hinge assembly that rotatably couples the first housing and the second housing, where the hinge assembly includes permanent magnets that generate a first magnetic field and a second magnetic field orientable with respect to each other via rotation of the second housing with respect to the first housing, where the first magnetic field and the second magnetic field include an aligned orientation, generate a clockwise restoring torque responsive to rotation in a first rotational direction from the aligned orientation, and generate a counterclockwise restoring torque responsive to rotation in a second, opposite rotational direction from the aligned orientation. In such an example, the aligned orientation can correspond to an angle of approximately 90 degrees between the first housing and the second housing.

As an example, for an angle less than approximately 90 degrees, a first magnetic field and a second magnetic field can generate a clockwise or counterclockwise restoring torque and, for an angle greater than approximately 90 degrees, the first magnetic field and the second magnetic field can generate a counterclockwise or a clockwise restoring torque, respectively.

As an example, a first rotational direction can be in a range of rotational angles that are greater than 90 degrees and less than 180 degrees and a second, opposite rotational direction can be in a range of rotational angles that are less than 90 degrees and greater than 0 degrees.

As an example, a first magnetic field can include a north pole and a south pole and a second magnetic field can include a north pole and a south pole, which can be aligned with an aligned orientation such that poles facing each other are opposite and attract. In such an example, over a range of angles α clockwise restoring torque and/or a counterclockwise restoring torque can approximate at least a portion of a sine function. In such an example, the range of rotational angles can include an angle of the aligned orientation.

As an example, a hinge assembly can include permanent magnets that include a rotational part that generates a first magnetic field and a stationary part that generates a second magnetic field. In such an example, the rotational part and the stationary part can be aligned along a common axis.

As an example, a hinge assembly can include one or more friction elements. As an example, a system can include a friction hinge assembly. As an example, a system can include a first permanent magnet hinge assembly and a second permanent magnet hinge assembly. In such an example, the first and second permanent magnet hinge assemblies may be paired and handle approximately one-half of a torque load of a gravity related torque of a housing. As an example, hinge assemblies may differ such that one handles a different amount of gravity related torque than another.

As an example, a system can include a first housing, a second housing and a hinge assembly that rotatably couples the first and second housings, where the second housing has a mass $m_2$ and a center of mass disposed a distance $L_2$ from a hinge assembly, and where a maximum value of a clockwise restoring torque is greater than a gravity related torque $m_2 * L_2 * g$ of the second housing about the hinge assembly, where g is the acceleration of gravity. In such an example, the system can include one or more friction elements that hinder movement of the second housing by the maximum value of the clockwise restoring torque being greater than gravity related torque $m_2 * L_2 * g$ of the second housing about the hinge assembly. As an example, one or more friction elements can include at least one ring disposed about an axle.

As an example, a system can include a first housing, a second housing and a hinge assembly that rotatably couples the first and second housings, where the second housing has a mass $m_2$ and a center of mass disposed a distance $L_2$ from the hinge assembly, and where a gravity related torque $m_2 * L_2 * g$ of the second housing about the hinge assembly, where g is the acceleration of gravity, is greater than a maximum value of the clockwise restoring torque. In such an example, the system can include one or more friction elements that hinder movement of the second housing by the gravity related torque $m_2 * L_2 * g$ of the second housing about the hinge assembly being greater than the maximum value of the clockwise restoring torque. As an example, one or more friction elements can include at least one ring disposed about an axle.

As an example, a method can include stabilizing a position of a display housing with respect to a keyboard housing of an information handling system that includes a hinge assembly that rotatably couples the display housing and the keyboard housing, where the hinge assembly includes permanent magnets that generate a restoring torque that counteracts a gravity related torque of the display housing about the hinge assembly. In such an example, the position of the display housing with respect to the keyboard housing can be characterized by an angle between the display housing and the keyboard housing that is greater than 90 degrees. In such an example, the position can be a first position and the method can further include stabilizing a second position of the display housing with respect to the keyboard housing, where the second position is characterized by an angle between the display housing and the keyboard housing that is less than 90 degrees. As an example, a position of a display housing with respect to a keyboard housing can be characterized by an angle between the display housing and the keyboard housing that is less than 90 degrees. As an example, a restoring torque can be in a first direction for an angle less than 90 degrees and in a second, opposite direction for an angle greater than 90 degrees. As an example, at 90 degrees, a torque of a magnetic hinge assembly may be approximately zero. In such an example, a center of mass of a display housing can be subject to the acceleration of gravity in a direction that is downward such that a gravity related torque is approximately zero.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 26:
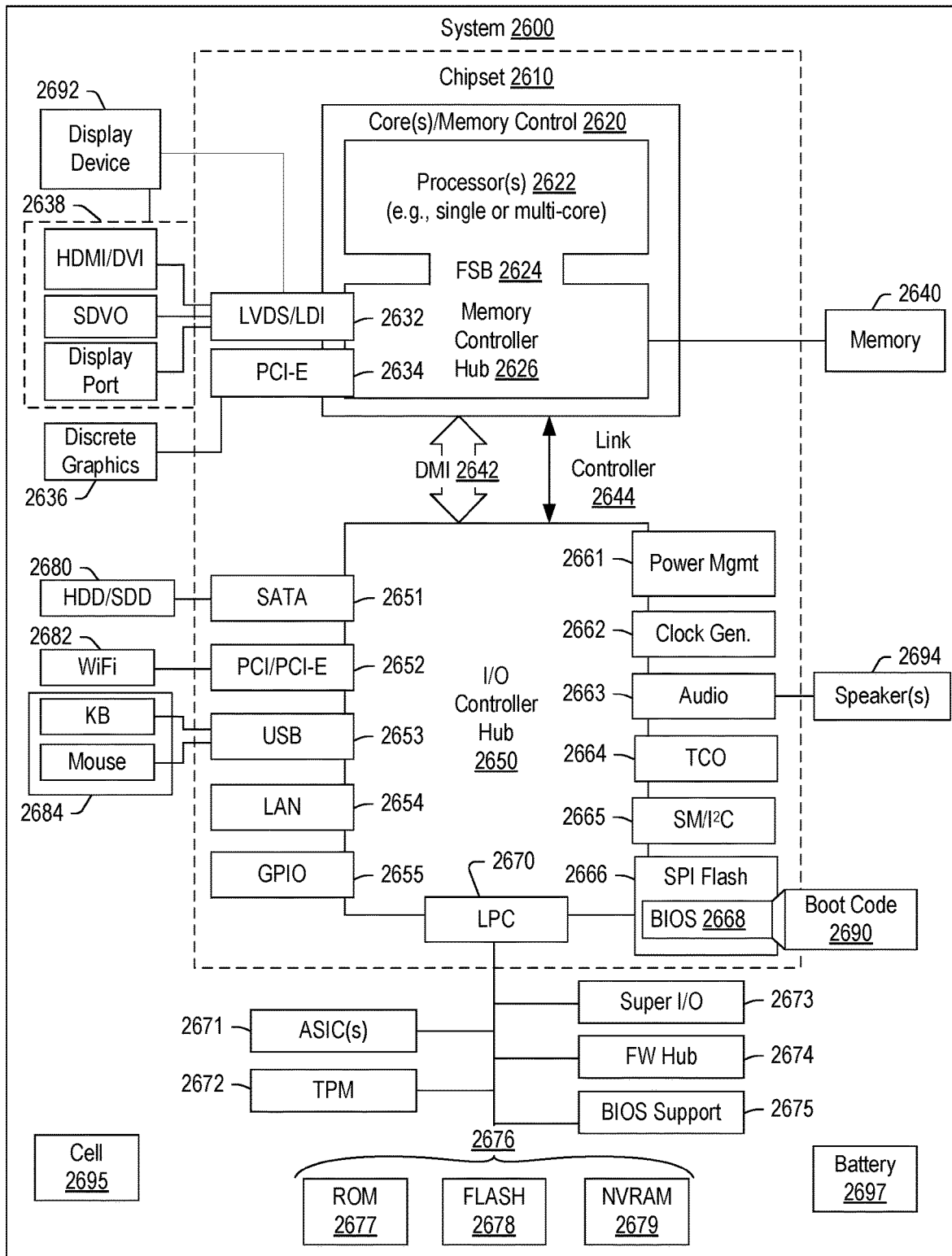
FIG. 26 is a diagram of an example of a system that includes one or more processors.

While various examples of circuits or circuitry have been discussed, FIG. 26 depicts a block diagram of an illustrative computer system 2600. The system 2600 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 2600. As an example, a system such as the system 100 of FIG. 1 may include at least some of the features of the system 2600.

As shown in FIG. 26, the system 2600 includes a so-called chipset 2610. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 26, the chipset 2610 has a particular architecture, which may vary to some extent depending on brand or manufacturer. The architecture of the chipset 2610 includes a core and memory control group 2620 and an I/O controller hub 2650 that exchange information (e.g., data, signals, commands, etc.) via, for example, a direct management interface or direct media interface (DMI) 2642 or a link controller 2644. In the example of FIG. 26, the DMI 2642 is a chip-to-chip interface (sometimes referred to as being a link between a "northbridge" and a "southbridge").

The core and memory control group 2620 include one or more processors 2622 (e.g., single core or multi-core) and a memory controller hub 2626 that exchange information via a front side bus (FSB) 2624. As described herein, various components of the core and memory control group 2620 may be integrated onto a single processor die, for example, to make a chip that supplants the conventional "northbridge" style architecture.

The memory controller hub 2626 interfaces with memory 2640. For example, the memory controller hub 2626 may provide support for DDR SDRAM memory (e.g., DDR, DDR2, DDR3, etc.). In general, the memory 2640 is a type of random-access memory (RAM). It is often referred to as "system memory".

The memory controller hub 2626 further includes a low-voltage differential signaling interface (LVDS) 2632. The LVDS 2632 may be a so-called LVDS Display Interface (LDI) for support of a display device 2692 (e.g., a CRT, a flat panel, a projector, etc.). A block 2638 includes some examples of technologies that may be supported via the LVDS interface 2632 (e.g., serial digital video, HDMI/DVI, display port). The memory controller hub 2626 also includes one or more PCI-express interfaces (PCI-E) 2634, for example, for support of discrete graphics 2636. Discrete graphics using a PCI-E interface has become an alternative approach to an accelerated graphics port (AGP). For example, the memory controller hub 2626 may include a 16-lane (×16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 2650 includes a variety of interfaces. The example of FIG. 26 includes a SATA interface 2651, one or more PCI-E interfaces 2652 (optionally one or more legacy PCI interfaces), one or more USB interfaces 2653, a LAN interface 2654 (more generally a network interface), a general purpose I/O interface (GPIO) 2655, a low-pin count (LPC) interface 2670, a power management interface 2661, a clock generator interface 2662, an audio interface 2663 (e.g., for speakers 2694), a total cost of operation (TCO) interface 2664, a system management bus interface (e.g., a multi-master serial computer bus interface) 2665, and a serial peripheral flash memory/controller interface (SPI Flash) 2666, which, in the example of FIG. 26, includes BIOS 2668 and boot code 2690. With respect to network connections, the I/O hub controller 2650 may include integrated gigabit Ethernet controller lines multiplexed with a PCI-E interface port. Other network features may operate independent of a PCI-E interface.

The interfaces of the I/O hub controller 2650 provide for communication with various devices, networks, etc. For example, the SATA interface 2651 provides for reading, writing or reading and writing information on one or more drives 2680 such as HDDs, SDDs or a combination thereof. The I/O hub controller 2650 may also include an advanced host controller interface (AHCI) to support one or more drives 2680. The PCI-E interface 2652 allows for wireless connections 2682 to devices, networks, etc. The USB interface 2653 provides for input devices 2684 such as keyboards (KB), one or more optical sensors, mice and various other devices (e.g., microphones, cameras, phones, storage, media players, etc.). On or more other types of sensors may optionally rely on the USB interface 2653 or another interface (e.g., I²C, etc.). As to microphones, the system 2600 of FIG. 26 may include hardware (e.g., audio card) appropriately configured for receipt of sound (e.g., user voice, ambient sound, etc.).

In the example of FIG. 26, the LPC interface 2670 provides for use of one or more ASICs 2671, a trusted platform module (TPM) 2672, a super I/O 2673, a firmware hub 2674, BIOS support 2675 as well as various types of memory 2676 such as ROM 2677, Flash 2678, and non-volatile RAM (NVRAM) 2679. With respect to the TPM 2672, this module may be in the form of a chip that can be used to authenticate software and hardware devices. For example, a TPM may be capable of performing platform authentication and may be used to verify that a system seeking access is the expected system.

The system 2600, upon power on, may be configured to execute boot code 2690 for the BIOS 2668, as stored within the SPI Flash 2666, and thereafter processes data under the control of one or more operating systems and application software (e.g., stored in system memory 2640). An operating system may be stored in any of a variety of locations and accessed, for example, according to instructions of the BIOS 2668. Again, as described herein, a satellite, a base, a server or other machine may include fewer or more features than shown in the system 2600 of FIG. 26. Further, the system 2600 of FIG. 26 is shown as optionally include cell phone circuitry 2695, which may include GSM, CDMA, etc., types of circuitry configured for coordinated operation with one or more of the other features of the system 2600. Also shown in FIG. 26 is battery circuitry 2697, which may provide one or more battery, power, etc., associated features (e.g., optionally to instruct one or more other components of the system 2600). As an example, a SMBus may be operable via a LPC (see, e.g., the LPC interface 2670), via an I²C interface (see, e.g., the SM/I²C interface 2665), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
a first housing that comprises a processor and memory accessible to the processor;
a second housing that comprises a display operatively coupled to the processor;
a hinge assembly that rotatably couples the first housing and the second housing, wherein the hinge assembly comprises permanent magnets that generate a first magnetic field and a second magnetic field orientable with respect to each other via rotation of the second housing with respect to the first housing, wherein the first magnetic field and the second magnetic field comprise an aligned orientation, generate a clockwise restoring torque that counteracts a gravity related torque of the second housing about the hinge assembly responsive to rotation in a first rotational direction from the aligned orientation, and generate a counterclockwise restoring torque that counteracts a gravity related torque of the second housing about the hinge assembly responsive to rotation in a second, opposite rotational direction from the aligned orientation.

2. The system of claim 1, wherein the aligned orientation corresponds to an angle of approximately 90 degrees between the first housing and the second housing.

3. The system of claim 1, wherein, for an angle less than approximately 90 degrees, the first magnetic field and the second magnetic field generate a clockwise or counterclockwise restoring torque and wherein, for an angle greater than approximately 90 degrees, the first magnetic field and the second magnetic field generate a counterclockwise or a clockwise restoring torque, respectively.

4. The system of claim 1, wherein the first rotational direction is in a range of rotational angles that are greater than 90 degrees and less than 180 degrees and wherein the second, opposite rotational direction is in a range of rotational angles that are less than 90 degrees and greater than 0 degrees.

5. The system of claim 1, wherein the first magnetic field comprises a north pole and a south pole, wherein the second magnetic field comprises a north pole and a south pole, and wherein the clockwise restoring torque and the counterclockwise restoring torque approximate at least a portion of a sine function with respect to a range of rotational angles that comprise an angle of the aligned orientation.

6. The system of claim 1, wherein the permanent magnets comprise a rotational part that generates the first magnetic field and a stationary part that generates the second magnetic field.

7. The system of claim 6, wherein the rotational part and the stationary part are aligned along a common axis.

8. The system of claim 1, wherein the hinge assembly comprises one or more friction elements.

9. The system of claim 1, comprising a friction hinge assembly.

10. The system of claim 1, wherein the hinge assembly comprises a first permanent magnet hinge assembly and further comprising a second permanent magnet hinge assembly.

11. The system of claim 1, wherein the second housing comprises a mass $m_2$ and a center of mass disposed a distance $L_2$ from the hinge assembly, and wherein a maximum value of the clockwise restoring torque is greater than a gravity related torque $m_2*L_2*g$ of the second housing about the hinge assembly, where g is the acceleration of gravity.

12. The system of claim 11, comprising one or more friction elements that hinder movement of the second housing by the maximum value of the clockwise restoring torque being greater than the gravity related torque $m_2*L_2*g$ of the second housing about the hinge assembly.

13. The system of claim 12, wherein the one or more friction elements comprise at least one ring disposed about an axle.

14. The system of claim 1, wherein the second housing comprises a mass $m_2$ and a center of mass disposed a distance $L_2$ from the hinge assembly, and wherein a gravity related torque $m_2*L_2*g$ of the second housing about the hinge assembly, where g is the acceleration of gravity, is greater than a maximum value of the clockwise restoring torque.

15. The system of claim 14, comprising one or more friction elements that hinder movement of the second housing by the gravity related torque $m_2*L_2*g$ of the second housing about the hinge assembly being greater than the maximum value of the clockwise restoring torque.

16. The system of claim 15, wherein the one or more friction elements comprise at least one ring disposed about an axle.

17. A method comprising:
stabilizing a position of a display housing with respect to a keyboard housing of an information handling system that comprises a hinge assembly that rotatably couples the display housing and the keyboard housing, wherein the hinge assembly comprises permanent magnets that generate a first magnetic field and a second magnetic field orientable with respect to each other via rotation of the display housing with respect to the keyboard housing, wherein the first magnetic field and the second magnetic field comprise an aligned orientation, generate a clockwise restoring torque that counteracts a gravity related torque of the display housing about the hinge assembly responsive to rotation in a first rotational direction from the aligned orientation, and generate a counterclockwise restoring torque that counteracts a gravity related torque of the display housing about the hinge assembly responsive to rotation in a second, opposite rotational direction from the aligned orientation.

18. The method of claim 17, wherein the position of the display housing with respect to the keyboard housing is characterized by an angle between the display housing and the keyboard housing that is greater than 90 degrees.

19. The method of claim 18, wherein the position comprises a first position and further comprising stabilizing a second position of the display housing with respect to the keyboard housing, wherein the second position is characterized by an angle between the display housing and the keyboard housing that is less than 90 degrees.

20. The method of claim 17, wherein the position of the display housing with respect to the keyboard housing is characterized by an angle between the display housing and the keyboard housing that is less than 90 degrees.

* * * * *